US006240828B1

(12) United States Patent
Fujimoto

(10) Patent No.: US 6,240,828 B1
(45) Date of Patent: Jun. 5, 2001

(54) PISTON OF INTERNAL COMBUSTION ENGINE

(75) Inventor: Hiroya Fujimoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/288,715

(22) Filed: Apr. 9, 1999

(30) Foreign Application Priority Data

Apr. 21, 1998 (JP) ..................................... 10-110018
Sep. 7, 1998 (JP) ..................................... 10-252437

(51) Int. Cl.[7] ..................................... F16J 1/04
(52) U.S. Cl. ..................................... 92/214; 92/225
(58) Field of Search ..................................... 92/208, 214, 232, 92/222, 225, 226, 227, 228, 229, 230

(56) References Cited

U.S. PATENT DOCUMENTS

| | | | | |
|---|---|---|---|---|
| 1,960,313 | * | 5/1934 | Long | 92/236 |
| 2,017,348 | * | 10/1935 | Long | 92/236 |
| 2,017,630 | * | 10/1935 | Long | 92/238 X |
| 3,189,010 | * | 6/1965 | Isley | 92/231 X |
| 4,754,731 | | 7/1988 | Böhm et al. . | |
| 5,562,074 | * | 10/1996 | Koch | 92/239 X |

FOREIGN PATENT DOCUMENTS

| | | | | |
|---|---|---|---|---|
| 630 440 | | 5/1936 | (DE) . | |
| 2938018 | * | 4/1981 | (DE) | 123/193.6 |
| 3430056 | * | 1/1986 | (DE) | 123/193.6 |
| 0 210 649 | | 2/1987 | (EP) . | |
| 530 570 | | 12/1940 | (GB) . | |
| 2 107 429 | | 4/1983 | (GB) . | |
| 59-215940 | * | 12/1984 | (JP) | 123/193.6 |
| 60-240854 | * | 11/1985 | (JP) | 123/193.6 |
| 61-272452 | * | 12/1986 | (JP) | 123/193.6 |
| 62-10455 | * | 1/1987 | (JP) | 123/193.6 |
| 62-243915 | * | 10/1987 | (JP) | 123/193.6 |
| 63-124851 | * | 5/1988 | (JP) | 123/193.6 |
| 5-10209 | * | 1/1993 | (JP) | 123/193.6 |
| 6-2611 | * | 1/1994 | (JP) | 123/193.6 |
| 6-101566 | | 4/1994 | (JP) . | |

* cited by examiner

*Primary Examiner*—John E. Ryznic
(74) *Attorney, Agent, or Firm*—Foley & Lardner

(57) ABSTRACT

A piston of an internal combustion engine, comprises a skirt portion in sliding-contact with a cylinder wall, an inner crown-plus-boss portion having a crown portion and piston-pin boss portions, and a stay portion interconnecting the skirt portion and the inner crown-plus-boss portion at a lower portion of the piston. Also provided is an annular partition groove through which a rim of the skirt portion and the inner crown-plus-boss portion are partitioned all around the circumference of the upper portion of the piston. A thermal-expansion absorption ring is tightly fitted into the annular partition groove in a gas tight-fashion. The top face of the inner crown-plus-boss portion, the flat face of the rim of the skirt portion, and the top wall of the thermal-expansion absorption ring serve as a piston crown.

28 Claims, 27 Drawing Sheets

PISTON OF INTERNAL COMBUSTION ENGINE

BACKGROUND OF THE INVENTION

1. Field of the Invention

The present invention relates to the improvements of a reciprocating piston of an internal combustion engine suitable for automotive vehicles.

2. Description of the Prior Art

In reciprocating pistons used for automotive internal combustion engines, during reciprocating motion of the piston, the piston operates with the piston crown or piston head exposed to hot combustion gases, whereas the piston skirt contacts the comparatively cool cylinder wall. This results in a temperature gradient or difference from the top of the piston to the bottom. Generally, the temperature of the piston top exposed to the combustion chamber is higher than that of the piston bottom. Thus, there is a difference of thermal expansion from the top of the piston to the bottom. In order to control the effects of differential thermal expansion between the top and bottom portions of the piston and to absorb a relatively great thermal expansion of the top of the piston, the top portion of the piston is formed with a plurality of lands for example a top land, a second land, and a third land, so that there is a desired piston land-to-cylinder wall clearance between each of the lands and the cylinder wall. The desired piston land-to-cylinder wall clearance will be hereinafter referred to as a "thermal-expansion control clearance" or a "thermal-deflection control piston-to-cylinder clearance". The thermal-expansion control clearance contributes to absorption of the relatively great thermal expansion which takes place at the upper portion of the piston. Additionally, a plurality of piston rings, such as a top compression ring and a second compression ring, are fitted respectively to a ring groove defined between the top and second lands and a ring groove defined between the second and third lands, for effective sealing on the power stroke. One such reciprocating-piston structure of an automotive engine has been disclosed in Japanese Patent Provisional Publication No. 6-101566. As to the profile of the respective piston land and the profile of the piston skirt of the conventional reciprocating piston structure disclosed in the Japanese Patent provisional Publication No. 6-101566, the profile of upper and lower portions of the piston skirt is slightly inwardly curved to maintain an adequate oil film on the cylinder wall, and also at least the top land and the second land are designed to have respective curved tapers being continuous from the upper portion of the piston skirt to stabilize the behavior or reciprocating motion of the piston during operation of the engine. In other words, the thermal-expansion control clearance (the piston top-to-cylinder wall clearance) is designed to be relatively excessive. Thus, there is a tendency for some of fuel condensed to liquid droplets to remain in the thermal-expansion control clearance, thus resulting in deposits of hydrocarbon on piston rings, valves, and other engine parts, or in the piston ring grooves or beneath the piston crown. The relatively excessive thermal-expansion control clearance also results in increased oil consumption. To the contrary, if the thermal-expansion control clearance is insufficient, it is impossible to satisfactorily absorb the comparatively great thermal expansion of the top of the piston, and thus there is undesiredly increased friction between the cylinder wall and the top of the piston. Seizure of the piston in the cylinder could occur owing to thermal expansion insufficiently controlled. As discussed above, the conventional piston structure disclosed in the Japanese Patent provisional Publication No. 6-101566, has a relatively excessive piston land-to-cylinder wall clearance (or a relatively excessive thermal-expansion control clearance). In order to satisfy a necessary sealing performance of this clearance, and to prevent combustion pressure from escaping from the combustion chamber and to adjust the film of lubricating oil on the cylinder wall, the previously-noted conventional piston structure often uses a labyrinth seal. As is generally known, the labyrinth seal structure requires a plurality of piston rings fitted to the respective piston grooves, thereby resulting in the increase in total weight of the piston and also increasing an amount of frictional resistance during reciprocating motion of the piston. Additionally, in the piston of the curved profile or curved taper of the upper portion of the piston, provided for thermal expansion control at the top of the piston, the piston diameter is diametrically diminished from the piston-skirt upper portion (or the third land) to the top land, and thus there is an increased tendency for the piston slapping noise-reduction performance to be lowered.

SUMMARY OF THE INVENTION

Accordingly, it is an object of the invention to provide a reciprocating piston of an internal combustion engine for automotive vehicles which avoids the aforementioned disadvantages of the prior art.

It is another object of the invention to provide a piston of an internal combustion engine which properly controls or absorbs radial thermal expansion or thermal contraction occurring at the upper portion of the piston and thus suppresses frictional resistance, without providing a so-called thermal-expansion control clearance as defined between a cylinder wall and the top of the piston.

It is a further object of the invention to provide a piston of an internal combustion engine which properly controls radial thermal expansion or contraction at the upper portion of the piston without providing the so-called thermal-expansion control clearance, and enhances a temperature-rise property of the piston crown during cold engine operation, and thus promotes exhaust emission purification.

It is a still further object of the invention to provide a small-sized piston of an internal combustion engine of reduced friction resistance, reduced piston weight, enhanced sealing performance, suppressed piston slap (reduced piston slapping noise and vibrations).

It is another object of the invention to provide a small-sized piston structure having a sole piston ring, which provides a required sealing performance and minimizes frictional loss.

It is another object of the invention to provide a small-sized piston structure having a thermal expansion absorption ring which effectively absorbs thermal expansion occurring at the top of the piston.

It is another object of the invention to provide a small-sized piston having an oil passage structure which properly controls thermal expansion or contraction at the upper portion of the piston without providing the so-called thermal-expansion control clearance, and also suppresses excessive temperature-rise in the piston.

It is another object of the invention to provide a small-sized piston equipped with a piston crown having a ribbed portion at its back, which properly controls radial thermal expansion or contraction at the upper portion of the piston without providing the so-called thermal-expansion control clearance, and provides enhanced rigidity to deflection of the piston crown.

In order to accomplish the aforementioned and other objects of the present invention, a piston of an internal combustion engine comprises a skirt portion adapted to be in sliding-contact with a cylinder wall, an inner crown-plus-boss portion having a crown portion and piston-pin boss portions, a stay portion interconnecting the skirt portion and the inner crown-plus-boss portion at a lower portion of the piston, and a partition groove through which the skirt portion and the inner crown-plus-boss portion are partitioned all around the circumference of the upper portion of the piston. Preferably, a thermal-deflection absorption ring is fitted into the partition groove so that the thermal-deflection absorption ring is deformable in a radial direction of the piston for absorbing variations of a radial width of the partition groove.

DESCRIPTION OF THE PREFERRED EMBODIMENTS

Figure 1:
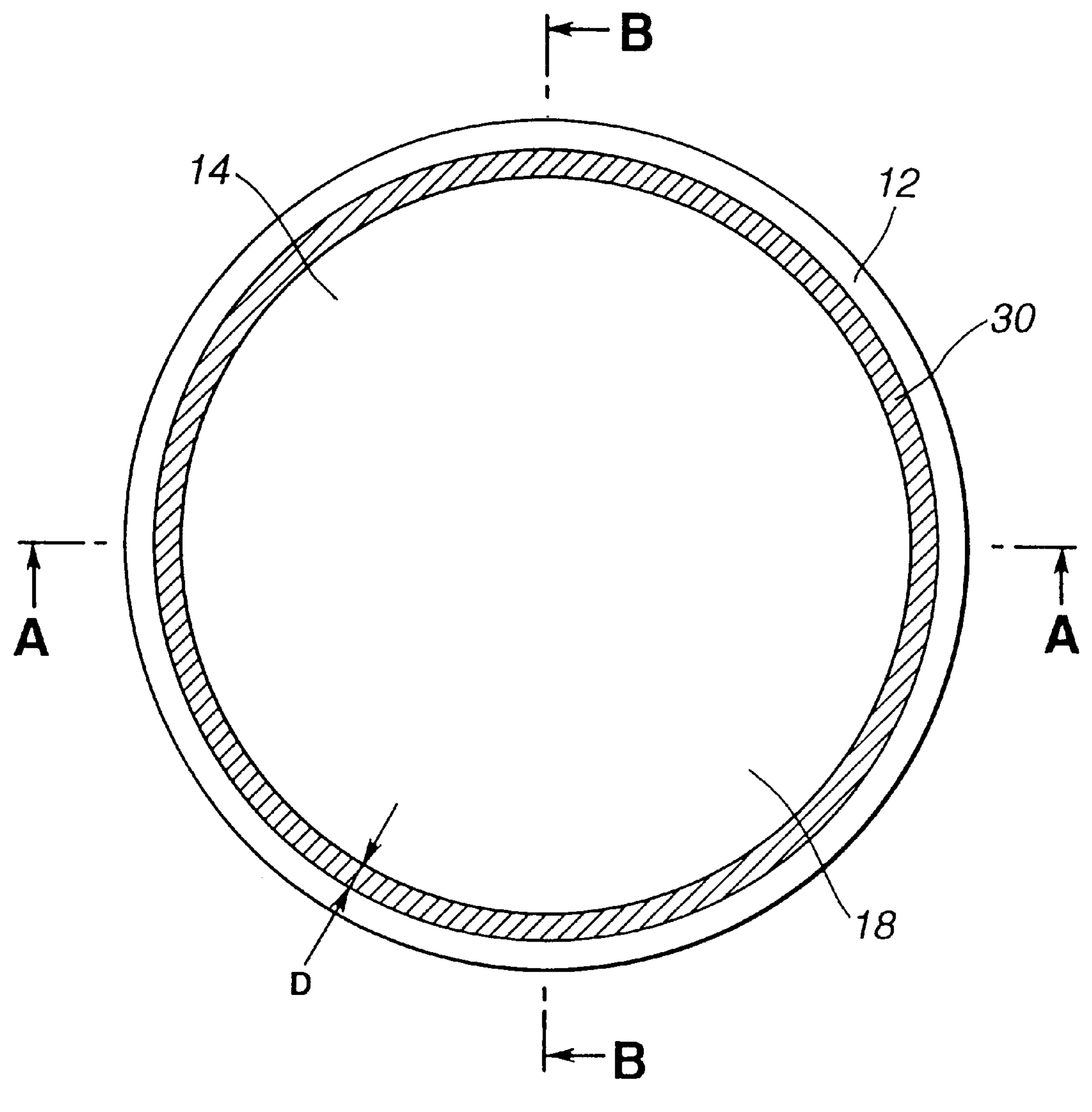
FIG. 1 is a top view of one embodiment of a reciprocating piston of the invention.
Figure 2:
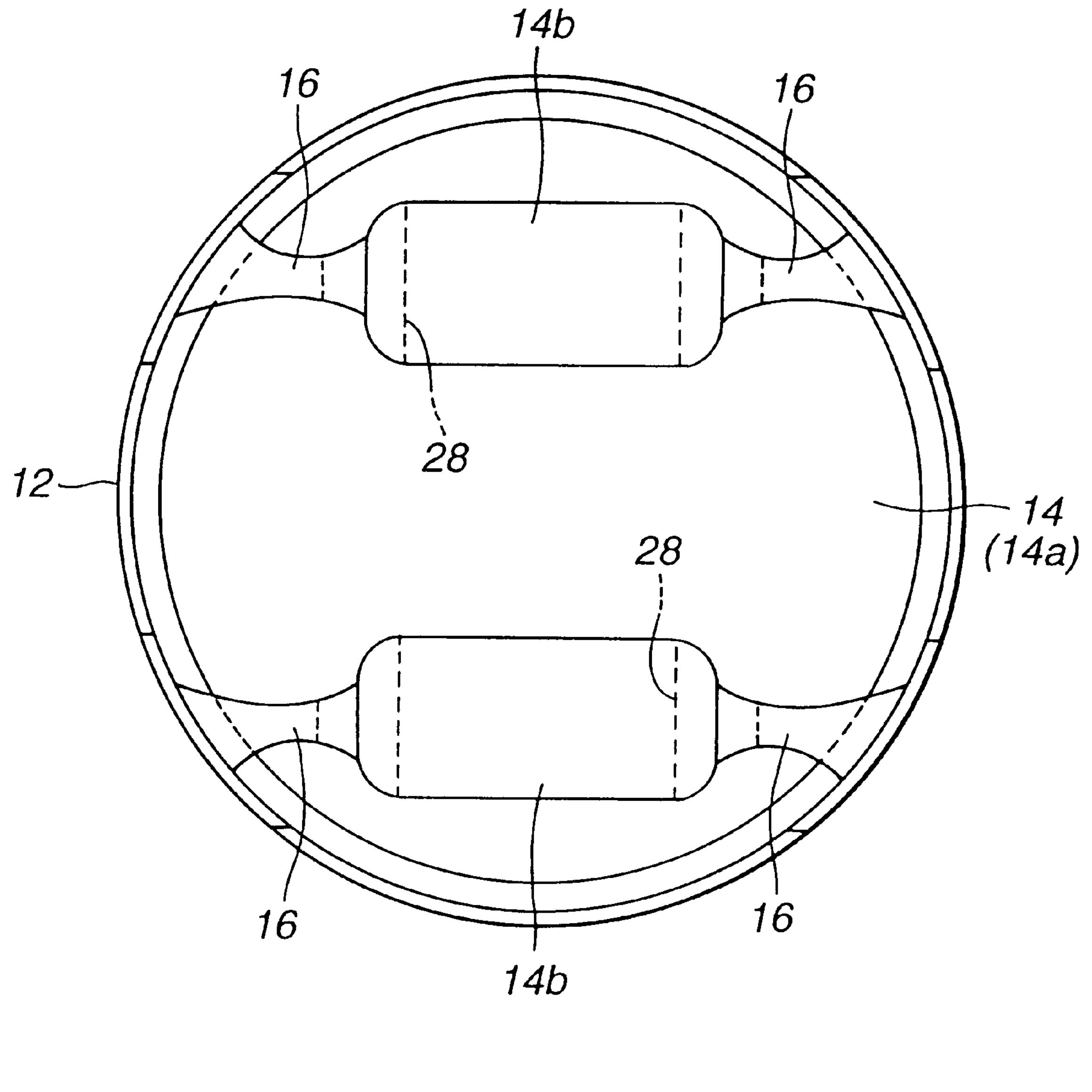
FIG. 2 is a bottom view of the reciprocating piston shown in FIG. 1.
Figure 3:
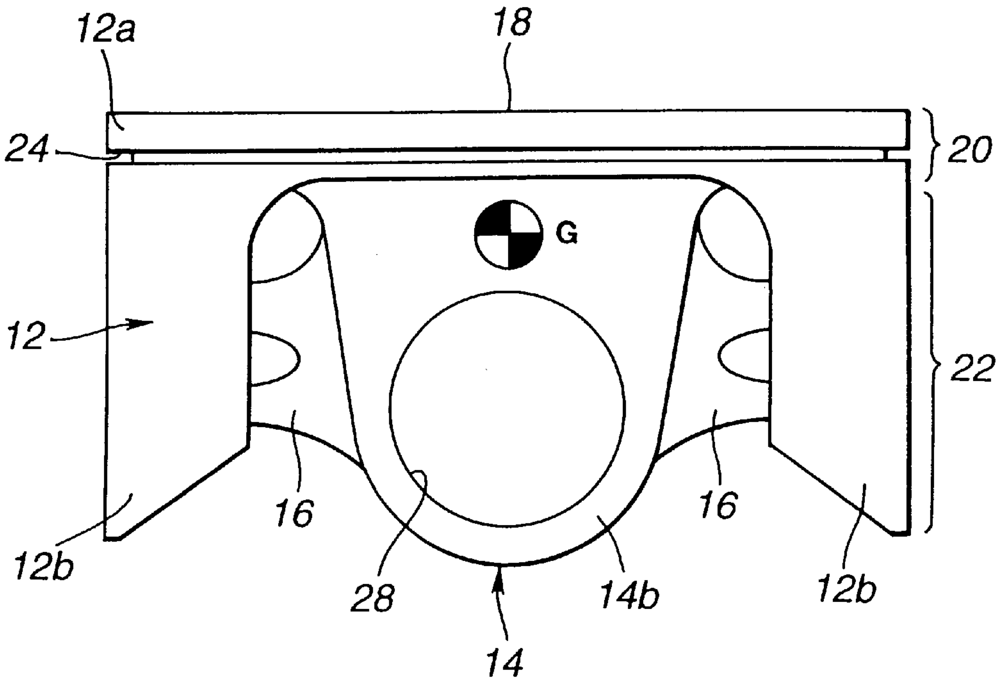
FIG. 3 is a front elevation view of the piston shown in FIG. 1.
Figure 4:
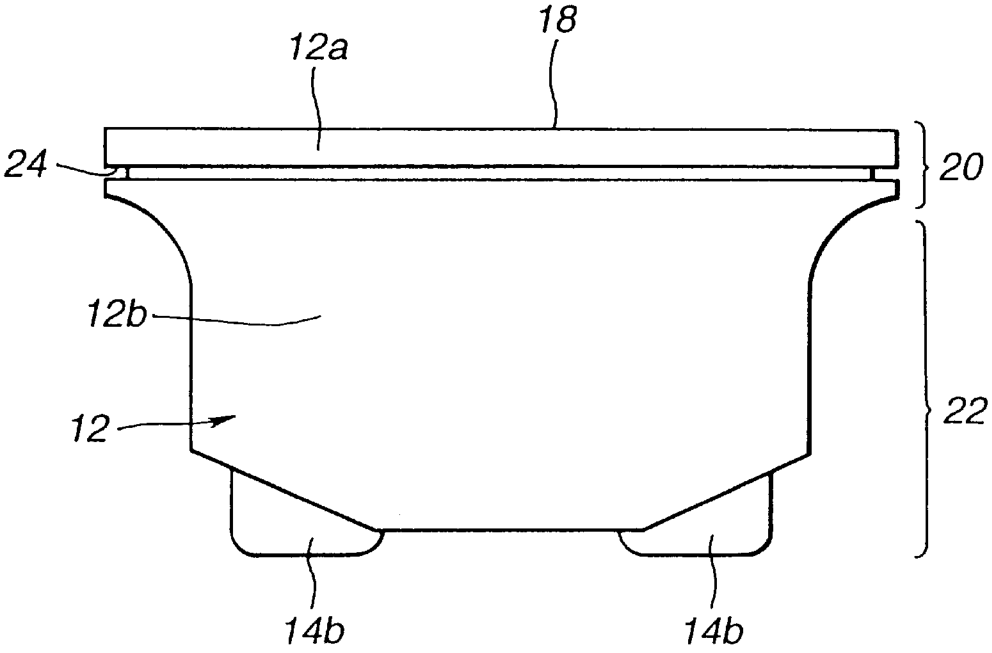
FIG. 4 is a front elevation view as viewed from a direction rotated from the angular position of FIG. 3 by 90 degrees.
Figure 5:
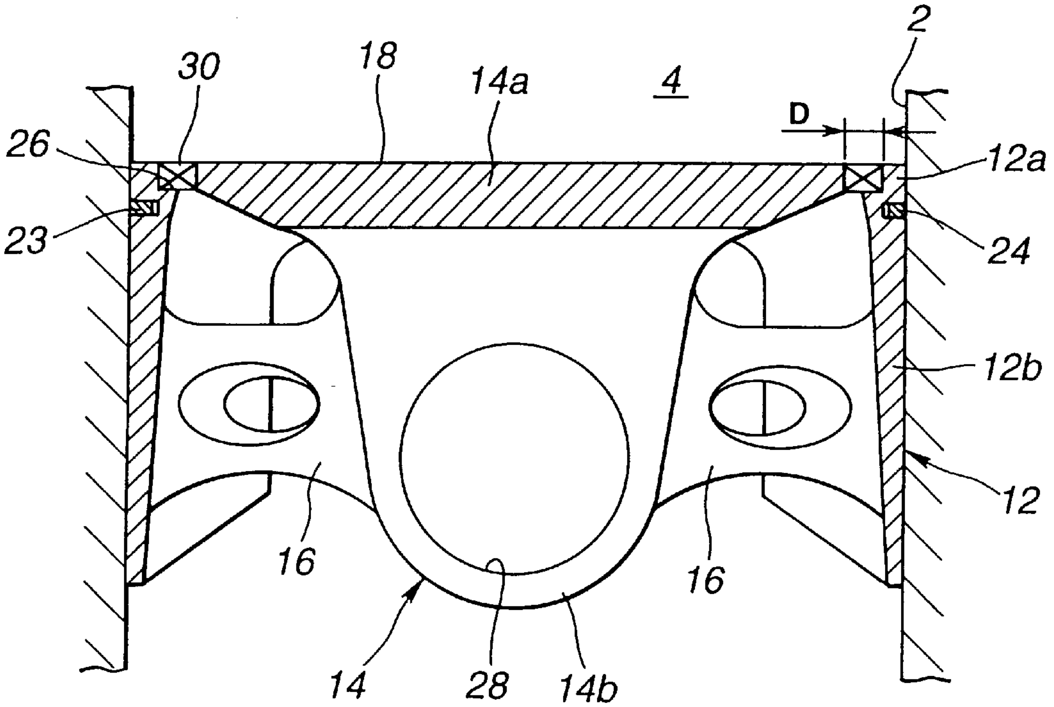
FIG. 5 is a longitudinal cross-sectional view taken along the line A—A of FIG. 1.
Figure 6:
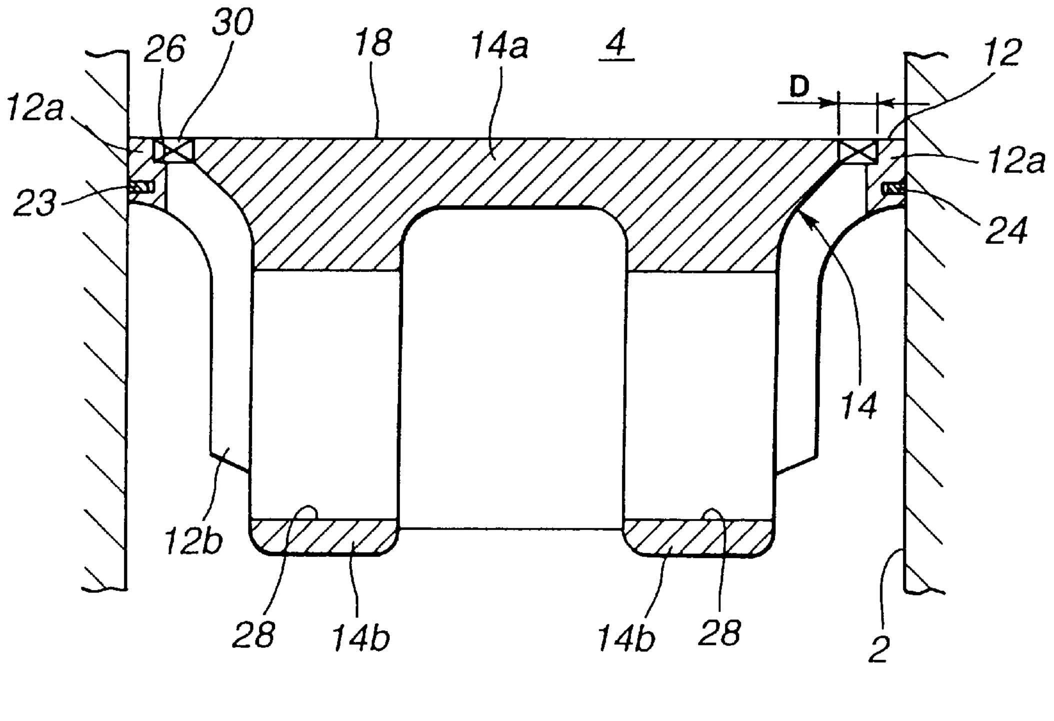
FIG. 6 is a longitudinal cross-sectional view taken along the line B—B of FIG. 1.

Referring now to the drawings, particularly to FIGS. 1 through 6, there is shown the fundamental concept of the reciprocating piston structure of the invention. As best seen in FIGS. 5 and 6, the piston of the embodiment comprises a substantially cylindrical, thin-walled outer piston skirt portion 12 being in sliding-contact with an inner peripheral wall (simply a cylinder wall) of an engine cylinder 2, an inner piston-crown and pin-boss portion (simply an inner crown-plus-boss portion) 14 located inside of the outer piston skirt portion 12, and a web-like stay portion (or a web-like support portion or a web-like apron portion) 16 by which the outer skirt portion 12 and the inner crown-plus-boss portion 14 are interconnected. In the shown embodiment, these portions 12, 14, and 16 are integrally formed with each other by way of metallic molds (or die forming). For light weight or compact size, the inner crown-plus-boss portion 14 is comprised of a thin-walled disc-like crown portion 14*a* constructing more of a piston crown or a piston head 18, and a pair of piston-pin boss portions (14*b*, 14*b*) spaced apart from each other in the axial direction of a piston pin or a gudgeon pin (not shown), and integrally formed on the underside of the crown portion 14*a*. The crown portion 14*a* has a flat upper face. Each of the pin boss portions (14*b*, 14*b*) has a piston-pin bore or piston-pin hole 28 to which the piston pin is loosely fitted. The inner crown-plus-boss portion 14 is largely cut out midway between the pin-boss portions (14*b*, 14*b*), to such an extent that a required mechanical strength is maintained, while reducing the weight of the piston. More precisely, the uppermost annular flat face of the rim of the outer piston skirt portion 12 forms a part of the piston crown 18. As seen in FIGS. 1 and 3–6, the upper portion 20 of the piston is comprised of the upper portion 12*a* of the outer piston skirt 12 as well as the thin-walled disc-like crown portion 14*a*. As shown in FIGS. 1, 5, and 6, the outer skirt portion 12 and the inner crown-plus-boss portion 14 are partitioned at the top face of the piston by an annular partition groove or an annular partition aperture or an annular separation slot D extending all around the circumference of the upper portion 20. In the piston structure of the embodiment, a thermal-expansion absorption ring or a thermal-deflection absorption ring 30 is fitted into the annular partition groove D with a comparatively high contact-surface pressure. For thermal expansion and contraction control, the thermal-expansion absorption ring 30 is deformable or deflectable or flexible in the radial direction of the piston. The details of the thermal-expansion absorption ring will be fully described later. As best seen in FIGS. 3 and 4, the outer piston skirt portion 12 comprises upper and lower skirt portions 12*a* and 12*b*. The upper skirt portion 12*a*, located in the upper portion 20 of the piston, is annularly formed all around the circumference of the upper portion 20 of the piston. At the upper portion 20 of the piston, the upper skirt portion 12*a* serves to provide a gas-tight seal between the cylinder wall 2 and the piston all around the circumference of the piston. In order to maintain strength while reducing material to lighten the piston itself and to ensure low frictional resistance, the lower skirt portion 12*b*, located in the lower portion 22 of the piston, is partly cut away under the pin boss portions (14*b*, 14*b*) in the axial direction of the piston pin (simply the piston-pin direction), to provide a piston skirt structure almost similar to a so-called open-type slipper skirt type and thus to remain a pair of thrust faces, namely a major thrust face (a power slide side) and a minor thrust face (a compression slide side) which has to possess good wear-resisting properties and mechanical strength. As shown in FIGS. 5 and 6, a sole circumferentially-extending piston ring groove 24 is formed in the outer peripheral wall of the upper skirt portion 12*a*. A piston ring 23 is fitted to the ring groove 24 to ensure a more effective sealing contact with the cylinder wall. The upper skirt portion 12*a* is formed on its uppermost end with an annular flat-faced rim having a stepped inner peripheral wall section 26. The previously-noted thermal-expansion absorption ring 30 is installed on the stepped inner peripheral wall section 26. Except for the piston ring groove 24, the outer peripheral wall surface of the outer piston skirt portion 12 (i.e., the skirt surface) is formed in a manner so as to extend on a substantially same circumference of a circle throughout its entire axial length (from the lowermost end of the skirt to the uppermost end). That is, the skirt profile of the piston skirt portion 12 is designed or dimensioned to have the same outside-diameter profile all over the entire axial length of the piston. Therefore, the outer piston skirt surface is closely fitted to the cylinder wall all over the whole skirt surface with less piston-to-cylinder wall clearance. As can be appreciated from FIGS. 2 and 5 in combination, in the shown embodiment, the web-like stay portion 16 is comprised of four web-like skirt joining portions, each interconnecting the outer peripheral wall surface of the associated piston-pin boss portion 14*b* and the inner peripheral wall surface of the lower skirt portion 12*b*. Except for the web-like stay portion 16, composed of the four support portions, the piston is formed with a comparatively large hollow or internal space extending over the entire axial length of the piston and within between the outer substantially-cylindrical skirt portion 12 and the inner crown-plus-boss portion 14, for more reduced piston weight. During operation of the engine, a temperature of the upper piston portion 20, involving the piston crown 18 forming a portion of the combustion chamber 4 and exposed to hot combustion gases, tends to become higher than that of the lower piston portion 22, because the lower portion is further from the combustion chamber 4. As a result, a thermal deflection (thermal expansion during warmed-up engine operation or thermal contraction during cold engine operation) occurring at the upper piston portion 20 becomes greater in comparison with the lower piston portion 22. In the improved piston structure of the embodiment, note that, at the uppermost end of the piston, upper skirt portion 12*a* and the piston crown portion 14*a* of the inner crown-plus-boss portion 14 are separated from each other by means of the annular partition groove D. That is to say, for thermal-deflection control, the annular partition groove D is provided or defined between the upper skirt portion 12*a* and the crown portion 14*a*, in lieu of the provision of the previously-noted thermal-deflection control piston-to-cylinder clearance. The annular partition groove D serves to provide increased flexibility of the upper piston portion 20 and to effectively absorb thermal expansion or thermal contraction (or variations of a width dimension of the partition groove D) in the radial direction of the piston. Furthermore, in the preferred embodiment, the thermal-expansion absorption ring 30 is fitted to the annular partition groove D, and thus the radial thermal deflection can be more efficiently properly absorbed by means of the thermal-expansion absorption ring 30 cooperating with the radially flexible uppermost portion of the piston skirt. Thus, there is no risk of excessively increased friction between the cylinder wall and the upper portion of the piston, and thus reducing cylinder-bore wear. As may be appreciated from FIGS. 1, 5 and 6, the annular partition groove D also serves as a slot heat dam which efficiently reduces heat transfer from the crown portion 14*a* to the upper skirt portion 12*a*. During cold engine operations, a temperature-rise property of the piston crown 18 can be enhanced by the provision of the annular partition groove D (acting as a heat dam). This promotes exhaust-emission purification, thus reducing exhaust emissions particularly during engine cold starting. As a matter of course, the skirt portion 12 itself expands due to heat transferred during operation. The rigidity of the piston skirt is generally designed to be adequately less than that of the engine cylinder to prevent excessive development of friction. The rigidity difference also contributes to various requirements, that is, quiet operation (smooth sliding motion of the piston against the cylinder wall), and long-life operation (satisfactory durability, adequate mechanical strength, proper thermal-expansion and thermal-contraction control). Moreover, in the improved piston structure of the embodiment, there is no need for a comparatively great thermal-expansion control piston-to-cylinder clearance as provided in the conventional piston with a plurality of piston lands, and therefore the piston-to-cylinder clearance can be reduced to a minimum by providing the annular partition groove D. This suppresses unburned fuel from remaining in the piston-to-cylinder clearance and to reduce deposits of unburned hydrocarbon (HC). In addition, the upper portion 12*a* of the outer piston skirt portion 12 is in sliding-contact with the cylinder wall all around the circumference of the top portion of the piston, thus insuring an enhanced sealing performance between the cylinder wall and the top portion of the piston. In other words, the number and thickness of the piston rings can be reduced to a minimum by using the thermal-deflection control structure of the embodiment, while ensuring a required sealing performance. Hitherto, a plurality of piston rings are fitted to ring grooves, whereas the improved piston structure of the invention minimizes the axial length of a piston top portion required for a piston ring groove, thus shortening the piston height. As discussed above, the piston skirt portion 12 is thin-walled and is substantially cylindrical in shape, and additionally the skirt portion 12 and the inner crown-plus-boss portion 14 are interconnected at the lower piston portion 22 by the web-like stay portion 16, thus reducing the weight of the piston and providing a more compact piston. In the piston structure of the embodiment, as appreciated from the hatched portion of the crown portion 14*a* shown in FIGS. 5 and 6, there is a tendency that more of mass of the piston is concentrated towards the upper piston portion 20 involving the comparatively heavier crown portion 14*a* rather than each of the mass of the skirt portion 12, the mass of the piston-pin boss portions 14*b*, and the mass of the web-like stay portion 16. Therefore, as shown in FIG. 3, the center-of-gravity G of the piston is located above the piston-pin bore 28. In the presence of excessive piston-to-cylinder clearance at the upper portion 20 of the piston, the farther the center-of-gravity G of the piston will be located away from the piston-pin boss, the more easily the piston slap and noise will occur, and whereby the attitude of the piston will become unstable and piston slapping noise reduction performance is lowered. According to the piston skirt profile of the embodiment, the skirt portion has a skirt profile of the same diameter throughout its entire length from the lowermost skirt portion to the uppermost skirt portion, and thus there is less piston-to-cylinder clearance at the upper portion 20 of the piston. This insures an enhanced sealing performance and maintains a stable attitude of the piston during the reciprocating motion, and thus ensures reduced piston slapping noise and vibrations.

Hereunder described in detail are various examples (30A–30L) of thermal-expansion absorption rings applicable to the piston structure of the invention and the construction of installation of each of the thermal-expansion absorption rings into the annular partition groove D.

Figure 7:
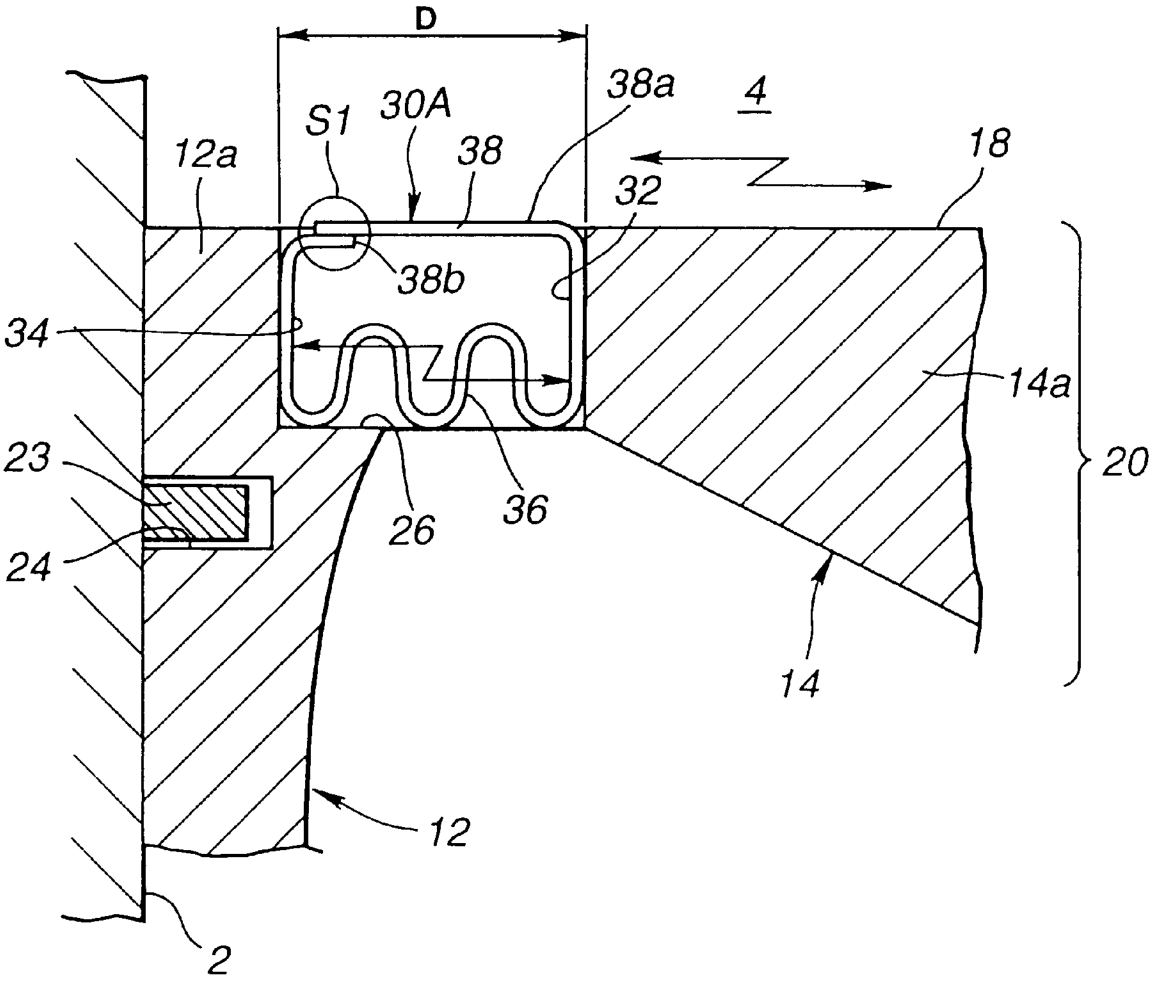
FIG. 7 is an enlarged cross section of the essential part of a first embodiment of the piston structure having a thermal-expansion absorption ring (30A) fitted into an annular partition groove or aperture (D) defined between the circumference of the piston crown and the upper portion of the piston skirt.

Referring now to FIG. 7, there is shown a thermal-expansion absorption ring 30A employed in the piston of the first embodiment. The thermal-expansion absorption ring 30A is formed into a substantially rectangular shape in cross section by bending sheet metal material having a small spring constant (or a small spring stiffness), so that the radial cross section of the ring 30A has five internal bends and two external bends and a closed end (see an overlap section S1 shown in FIG. 7), and that the substantially rectangular cross section is formed with a straight top side (a flat top wall 38), a corrugated bottom side (a corrugated bottom wall 36), and two opposing straight left and right sides (two opposing curved side walls 32 and 34). As seen in FIG. 7, the annular partition groove D is defined between the stepped inner peripheral wall section 26 of the upper skirt portion 12*a* and the outer peripheral wall surface or the outer cylindrical surface of the crown portion 14*a* all around the circumference of the piston. As seen in FIG. 7, the annular partition groove D has a rectangular shape in cross section. The closed end of the ring 30A is formed by overlapping an upper side portion 38*a* and a lower side portion 38*b* in such a manner as to allow radial relative-displacement (radial expansion or contraction) of one of the overlapped two portions 38*a* and 38*b* to the other. The thermal-expansion absorption ring 30A is tightly press-fitted into the annular partition groove D all around of the circumference of the piston. In more detail, the thermal-expansion absorption ring 30A comprises the inner side wall portion 32 being in wall-contact with the outer peripheral wall surface of the crown portion 14*a*, the outer side wall portion 34 being in wall-contact with the inner peripheral wall surface of the upper skirt portion 12*a*, the radially-deflectable corrugated bottom wall portion 36 mounted on the stepped inner peripheral wall section 26, and the top wall portion 38 lying substantially flush with both the annular flat-faced rim of the upper skirt portion 12*a* and the circular flat-faced top face of the crown portion 14*a*, and constructing part of the piston crown 18. The circumferentially-extending inner side wall portion 32 and the outer peripheral wall surface of the crown portion 14*a* are fitted to each other in a gas-tight fashion to provide a tight sealing effect between the combustion chamber side and the crankcase side. In the same manner, the circumferentially-extending outer side wall portion 34 and the inner peripheral wall surface of the upper skirt portion 12*a* are fitted to each other in a gas-tight fashion to provide a tight seal. Thus, with the thermal-expansion absorption ring 30A fitted into the annular partition groove D, undesired blow-by of high-pressure burnt gases past the piston and/or the escape of the compressed fuel charge from the combustion chamber 4 into the crankcase can be prevented, and additionally the leakage of lubricating oil from the crankcase to the combustion chamber 4 can be suppressed or prevented. The top wall portion 38 comprises the inner-periphery-side, radially-outwardly-bent upper side portion 38*a* and the outer-periphery-side, radially-inwardly-bent upper side portion 38*b*. The inner-periphery-side, radially-outwardly-bent upper side portion 38*a* is bent with a comparatively long bend width (measured in a radial direction perpendicular to a circumferentially-extending bend line) from the upper end of the inner side wall portion 32 along a curved line (a circumferentially-extending upper corner of the crown portion 14*a*), by way of a simple right-angle bending. On the other hand, the outer-periphery-side, radially-inwardly-bent upper side portion 38*b* is bent with a comparatively short bend width (measured in the radial direction) from the upper end of the outer side wall portion 34 along a curved line (a circumferentially-extending inner peripheral wall surface of the upper skirt portion 12*a*), by way of a simple right-angle bending. To provide the closed end, these upper side portions are overlapped with each other at the overlap section S1 shown in FIG. 7. More precisely, the inner-periphery-side upper side portion 38*a* is overlapped above the outer-periphery-side upper side portion 38*b*. As discussed above, the radial length (or the bend width) of the inner-periphery-side upper side portion 38*a* is longer than the outer-periphery-side upper side portion 38*b*, and thus the overlap section S1 is offset radially outwards from the centerline (or the neutral axis) between the two opposing side wall portions 32 and 34.

With the arrangement of the piston structure of the first embodiment with the thermal-expansion absorption ring 30A, in the presence of thermal expansion of the crown portion 14*a* in the radial direction during operation, the radial width of the previously-noted annular partition groove D becomes decreased with radial deflection or deformation of the thermal-expansion absorption ring 30A to absorb such thermal expansion and to properly control thermal expansion of the crown portion. Actually, the corrugated bottom wall portion 36 contracts in the radial direction, and at the same time the inner-periphery-side upper side portion 38*a* slides radially outwards along the upper face of the outer-periphery-side upper side portion 38*b*. During the compression, power, and exhaust stroke, combustion pressure in the combustion chamber 4 is applied to the top wall portion 38 as well as the uppermost annular flat-face of the rim of the upper skirt portion 12*a* and the piston crown 18 (the circular flat-faced top surface of the crown portion 14*a*). As to the combustion pressure loading on the top wall portion 38, composed of inner-periphery-side upper side portion 38*a* and the outer-periphery-side upper side portion 38*b*, more of such combustion pressure loads or acts on the upper side portion 38*a* having the comparatively long bend width and located just above the other upper side portion 38*b*. In addition, the radially-inwardly-bent upper side portion 38*b* has enough strength to support combustion pressure applied to the upper face of the thermal-expansion absorption ring 30A. Thus, the top wall portion 38 does not deflect in a direction of action of the compression pressure loading thereon, but the radially outwardly-bent upper side portion 38*a* is strongly pushed on the radially-inwardly-bent side portion 38*b*. As explained above, the sealing performance of the overlap section S1 is effectively enhanced, utilizing the rise in combustion pressure. The stepped inner peripheral wall section 26 of the upper skirt portion 12*a* functions to reliably support the thermal-expansion absorption ring 30A against the rise of in-cylinder pressure (or combustion pressure) in the combustion chamber 4. Alternatively, if the outer-periphery-side, radially-inwardly-bent upper side portion 38*b* is overlapped above the inner-periphery-side, radially-outwardly-bent upper side portion 38*a*, the outer-periphery-side upper side portion 38*b* must have a longer radial length (or a longer bend width) than the inner-periphery-side upper side portion 38*a*, so that the overlap section S1 is offset radially inwards from the centerline (or the neutral axis) between the two opposing side wall portions 32 and 34 and that the uppermost one of the two upper side portions 38*a* and 38*b* has a somewhat higher flexibility (in other words, a somewhat lower rigidity) than the other to ensure proper thermal-expansion or contraction control.

Figure 8:
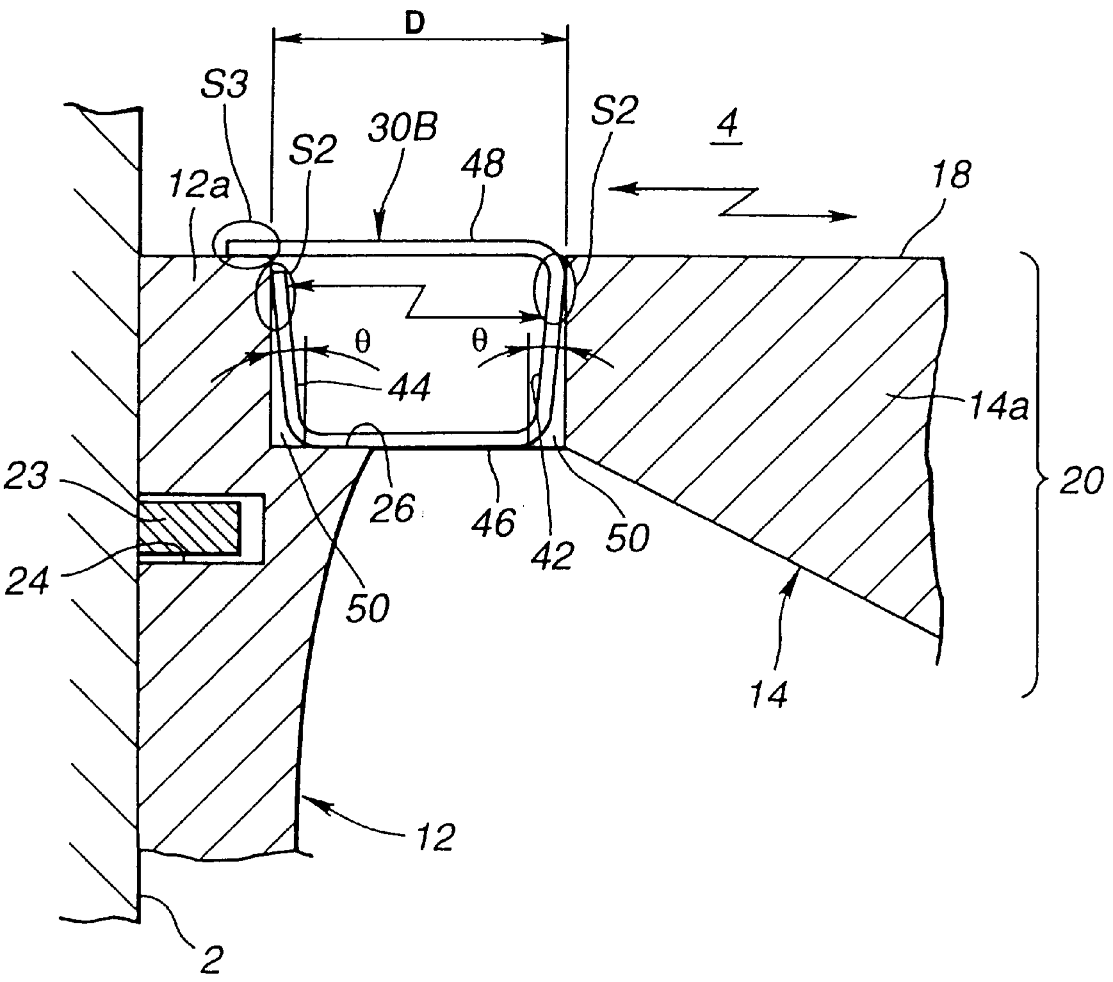
FIG. 8 is an enlarged cross section of the essential part of a second embodiment of the piston structure having another thermal-expansion absorption ring (30B).
Figure 9:
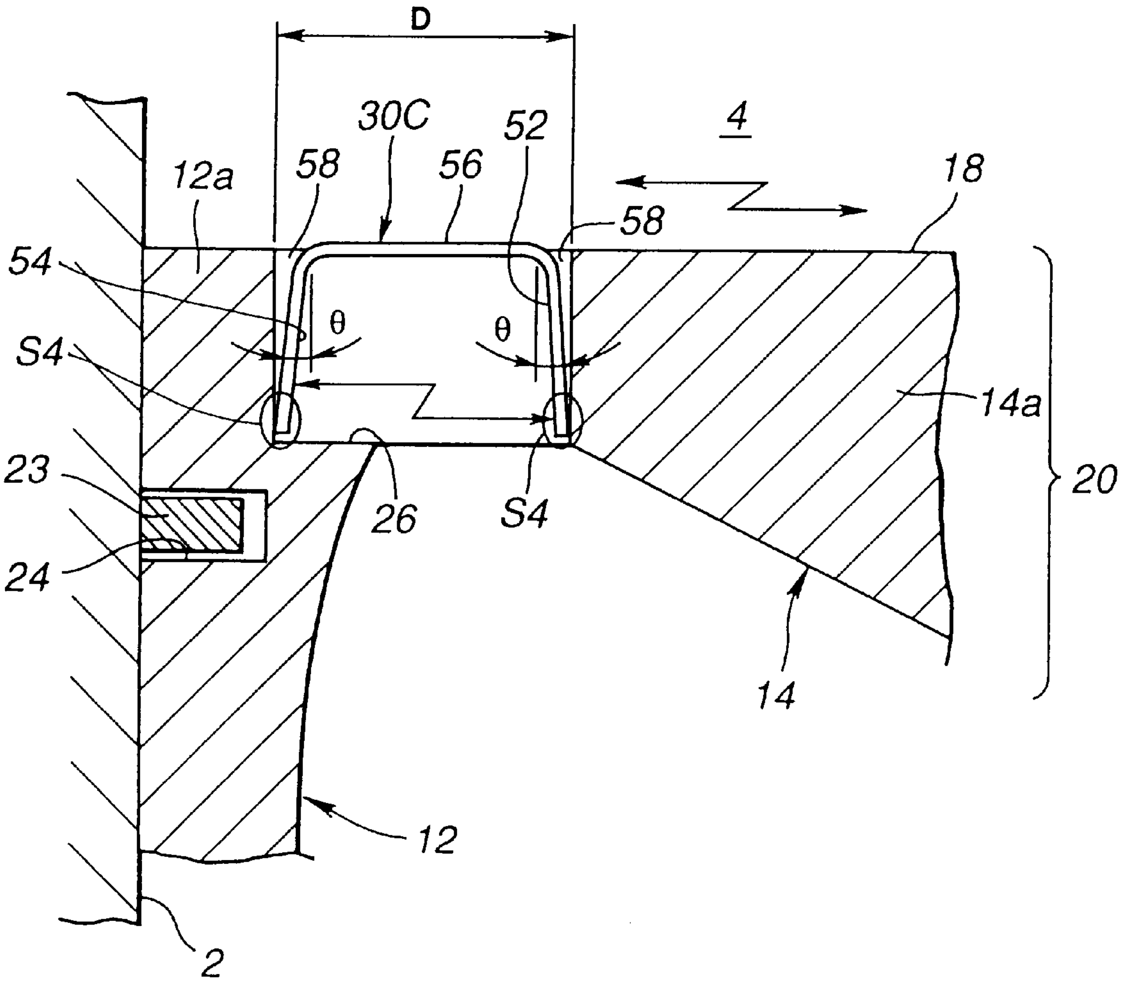
FIG. 9 is an enlarged cross section of the essential part of a third embodiment of the piston structure having another thermal-expansion absorption ring (30C).

Referring now to FIG. 8, there is shown a thermal-expansion absorption ring 30B employed in the piston of the second embodiment. The thermal-expansion absorption ring 30B of the second embodiment is formed into a substantially inverted trapezoidal shape in cross section by bending sheet metal material having a small spring constant, so that the radial cross section of the ring 30B has three internal bends and an open end (see the gap between a sliding-contact section S3 and a left-hand tight-fit section S2), and that the substantially inverted trapezoidal cross section is formed with a straight top side (a flat top wall 48), a flat bottom side (a flat bottom wall 46) parallel to the top side, and two opposing straight left and right sides (two opposing curved side walls 42 and 44). As seen in FIG. 8, the thermal-expansion absorption ring 30B is tightly press-fitted into the annular partition groove D, defined between the stepped inner peripheral wall section 26 of the upper skirt portion 12*a* and the outer peripheral wall surface or the outer cylindrical surface of the crown portion 14*a* all around the circumference of the piston and having a rectangular shape in cross section. Bending between the bottom wall portion 46 and the inner side wall portion 42 is made by an obtuse-angle bending, and thus the inner side wall portion 42 is slightly inclined inwards in the radial direction by an inclined angle θ with respect to the outer peripheral wall surface of the crown portion 14*a*. As appreciated from the right-hand tight-fit section S2 of FIG. 8, only the upper end of the inner side wall portion 42 is closely fitted to or in contact with the outer peripheral wall surface of the crown portion 14*a* in a gas tight-fashion. That is, a proper thermal-deflection absorption clearance 50 is defined between the lower end of the inner side wall portion 42 and the outer peripheral wall surface of the crown portion 14*a* to effectively absorb variations in the radial width of the annular partition groove D. Similarly, bending between the bottom wall portion 46 and the outer side wall portion 44 is made by an obtuse-angle bending, and thus the outer side wall portion 44 is slightly opened or inclined radially outwards by an inclined angle θ with respect to the inner peripheral wall surface of the rim of the upper skirt portion 12*a*. As appreciated from the left-hand tight-fit section S2 of FIG. 8, only the upper end of the outer side wall portion 44 is tightly fitted to the inner peripheral wall surface of the rim of the upper skirt portion 12*a* in a gas tight-fashion. That is, a proper thermal-deflection absorption clearance 50 is defined between the lower end of the outer side wall portion 44 and the inner peripheral wall surface of the rim of the upper skirt portion 12*a* to effectively absorb variations in the radial width of the annular partition groove D. To provide the above-mentioned thermal-deflection absorption clearance pair (50, 50), actually the bottom wall portion 46 is dimensioned to have a shorter radial width than the radial width of the annular partition groove D by the total width of the thermal-deflection absorption clearance pair. The annular partition groove D is tightly sealed in a gas-tight fashion by way of the tight-fit section S2 between the upper end of the inner side wall portion 42 and the outer peripheral wall surface of the crown portion 14*a* and the tight-fit section S2 between the upper end of the outer side wall portion 44 and the inner peripheral wall surface of the rim of the upper skirt portion 12*a*. This prevents the blow-by of high-pressure gases and/or the escape of compressed fuel charge from the combustion chamber 4 to the crankcase, and also avoids the leakage of lubricant from the crankcase to the combustion chamber. Bending between the inner side wall portion 42 and the top wall portion 48 is made by way of an acute-angle bending. The top wall portion 48 of the thermal-expansion absorption ring 30B lies substantially flush with both the uppermost flat-faced annular wall of the rim of the upper skirt portion 12*a* and the flat-faced top face of the crown portion 14*a* to form a portion of the piston crown 18. The outermost end (or the perimeter) of the top wall portion 48 is a sliding fit in the uppermost flat-faced annular wall of the rim of the upper skirt portion 12*a*. With the aforementioned arrangement of the piston structure of the second embodiment with the thermal-expansion absorption ring 30B, in the presence of thermal expansion of the upper portion 20 of the piston, the radial width of the annular partition groove D becomes shortened with radial deflection of the thermal-expansion absorption ring 30B. Concretely, the outer peripheral end of the top wall portion 48 slides radially outwards along the upper flat-faced annular wall of the rim of the upper skirt portion 12*a*, and simultaneously the inner side wall portion 42 is pressed against the outer peripheral wall surface (or the cylindrical side wall surface) of the the third embodiment. The thermal-expansion absorption ring 30C of the third embodiment is formed into a substantially inverted U shape in cross section by bending sheet metal material having a small spring constant, so that the radial cross section of the ring 30C has two internal bends, and that the substantially inverted-U- shaped cross section is formed with a straight top side (a flat top wall 56), and two opposing straight left and right sides (two opposing curved side walls 52 and 54). As seen in FIG. 9, the thermal-expansion absorption ring 30C is tightly press-fitted into the annular partition groove D, defined between the stepped inner peripheral wall section 26 of the upper skirt portion 12*a* and the outer cylindrical surface of the crown portion 14*a* all around the circumference of the piston and having a rectangular shape in cross section. Each of the two internal bending is made by an obtuse-angle bending, and thus the inner side wall portion 52 is slightly inclined radially inwards by an inclined angle θ with respect to the cylindrical side wall surface of the crown portion 14*a*, while the outer side wall portion 54 is slightly inclined radially outwards by an inclined angle θ with respect to the inner peripheral wall surface of the rim of the upper skirt portion 12*a*. As can be appreciated from the left and right tight-fit sections (S4, S4) shown in FIG. 9, only the lower end of the inner side wall portion 52 is tightly fitted to the cylindrical side wall surface of the crown portion 14*a* in a gas-tight fashion, and additionally only the lower end of the outside wall portion 54 is tightly fitted to the inner peripheral wall surface of the rim of the upper skirt portion 12*a* in a gas-tight fashion. Therefore, a pair of proper thermal-deflection crown portion 14*a* with its reduced inclined angle θ. At the same time, the outer side wall portion 44 is pressed against the inner peripheral wall surface of the rim of the upper skirt portion 12*a* while reducing the previously-noted inclined angle θ. Thus, due to the increases in thermal expansion at the upper portion 20 of the piston, the previously-noted thermal-deflection absorption clearances (50, 50) become reduced by virtue of proper deflection of the leaf-spring like, two-opposing slightly-inclined side wall portions 42 and 44. Furthermore, in the piston structure of the second embodiment, owing to the combustion pressure rise, the perimeter of the top wall portion 48, being in sliding-contact or sliding-fit with the uppermost flat-faced annular wall of the rim of the upper skirt portion 12*a*, is strongly pushed on the uppermost flat faced annular wall surface of the skirt. During running of the engine, the sealing performance of the sliding-contact section S3 can be enhanced voluntarily effectively according to the increase in the combustion pressure. In the second embodiment (FIG. 8), although the open end (the gap between the lower face of the flat top wall portion 48 and the uppermost end of the outer side wall portion 44) is provided at the outside of the ring 30B and also the sliding-contact section S3 is formed on the upper flat faced annular wall surface of the rim of the upper skirt portion 12*a*, it will be appreciated that the open end may be provided at the inside of the ring 30B and the sliding-contact section S3 may be formed on the perimeter (the outermost end) of the flat-faced top wall surface of the crown portion 14*a*.

Referring to FIG. 9, there is shown a thermal-expansion absorption ring 30C employed in the piston of absorption clearances (58, 58) are defined between the upper end of the inner side wall portion 52 and the cylindrical side wall surface of the crown portion 14*a*, and between the upper end of the outer side wall portion 54 and the inner peripheral wall surface of the rim of the upper skirt portion 12*a*, so as to effectively absorb variations in the radial width of the annular partition groove D. To provide the thermal-deflection absorption clearance pair (58, 58), the top wall portion 56 is dimensioned to have a shorter radial width than the radial width of the annular partition groove D by the total width of the thermal-deflection absorption clearance pair. The annular partition groove D is tightly sealed in a gas-tight fashion by way of the tight-fit section S4 between the lower end of the inner side wall portion 52 and the outer peripheral wall surface of the crown portion 14*a* and the tight-fit section S4 between the lower end of the outer side wall portion 54 and the inner peripheral wall surface of the rim of the upper skirt portion 12*a*. This prevents the blow-by of high-pressure gases and/or the escape of compressed fuel charge from the combustion chamber 4 to the crankcase, and also avoids the leakage of lubricant from the crankcase to the combustion chamber. The top wall portion 56 of the thermal-expansion absorption ring 30C lies substantially flush with both the uppermost flat-faced annular wall of the rim of the upper skirt portion 12*a* and the flat-faced top face of the crown portion 14*a* to form a portion of the piston crown 18. With the arrangement of the thermal-expansion absorption ring 30C, in the presence of thermal expansion of the upper portion 20 of the piston, the radial width of the annular partition groove D becomes shortened with radial deflection of the thermal-expansion absorption ring 30C. In more detail, according to the increases in thermal expansion, the inner side wall portion 52 is pressed against the outer peripheral wall surface of the crown portion 14*a* with its reduced inclined angle θ, while the outer side wall portion 54 is pressed against the inner peripheral wall surface of the rim of the upper skirt portion 12*a* with its reduced inclined angle θ. In this manner, the thermal expansion can be suitably controlled by way of a proper flexibility of the leaf-spring like, two opposing slightly-inclined side wall portions 52 and 54. Also, the sealing performance of the upper portion 20 of the piston is enhanced by virtue of increased tight-fit of each of the tight-fit sections (S4, S4), arising from thermal-expansion.

Figure 10:
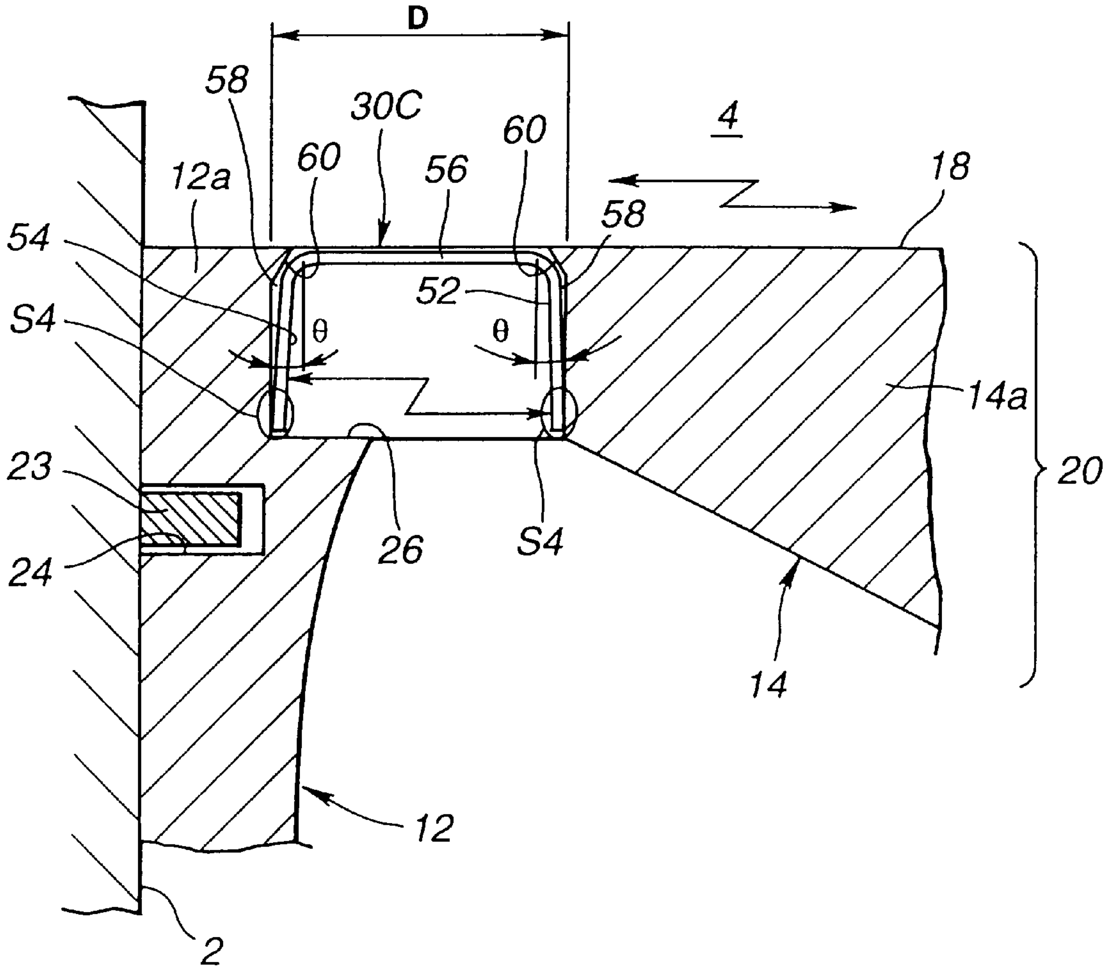
FIG. 10 is an enlarged cross section of the essential part of a fourth embodiment of the piston structure having the same thermal-expansion absorption ring (30C) as shown in FIG. 9 and two-opposing, circumferentially-extending, slightly-radially-projected edged portions (60, 60) acute-angled in cross section, and respectively located on the upper portion of the piston skirt and on the circumference of the piston crown.

Referring now to FIG. 10, there is shown the piston structure of the fourth embodiment with the thermal-expansion absorption ring 30C having the same cross-section as the third embodiment (FIG. 9). The piston structure of the fourth embodiment is similar to that of the third embodiment except that two-opposing, circumferentially-extending, slightly-radially-projected acute-angle edged portions 60 and 60 are formed respectively on the upper inside edged portion of the rim of the upper skirt portion 12*a* and on the upper outside edged portion of the crown portion 14*a*, after the ring 30C is press-fitted into the annular partition groove D. The two-opposing slightly-radially-projected acute-angle edged portions (60, 60) are formed for example by way of rolling. Each of the slightly-radially-projected acute-angle edged portions (60, 60) projects towards the partition groove D and extends in the circumferential direction of the piston in such a manner as to have a substantially triangular shape in cross section and to fill part of the thermal-deflection absorption clearance 58, while remaining a necessary thermal-deflection absorption clearance required for thermal-deflection control. In the piston structure of the fourth embodiment with the two-opposing slightly-radially-projected acute-angle edged portions (60, 60) as well as the same thermal-deflection absorption clearance as the that of the third embodiment, necessarily, the same effects as the third embodiment can be obtained. Additionally, with the provision of the respective acute-angle edged portions (60, 60), it is possible to reduce the deposits of combustion product which may enter from the combustion chamber 4 into the thermal-deflection absorption clearance 58. Furthermore, the two-opposing slightly-radially-projected acute-angle edged portions (60, 60) act to prevent falling of the thermal-expansion absorption ring 30C from the annular partition groove D and thus insures adequate support of the ring 30C in the annular partition groove D.

Figure 11:
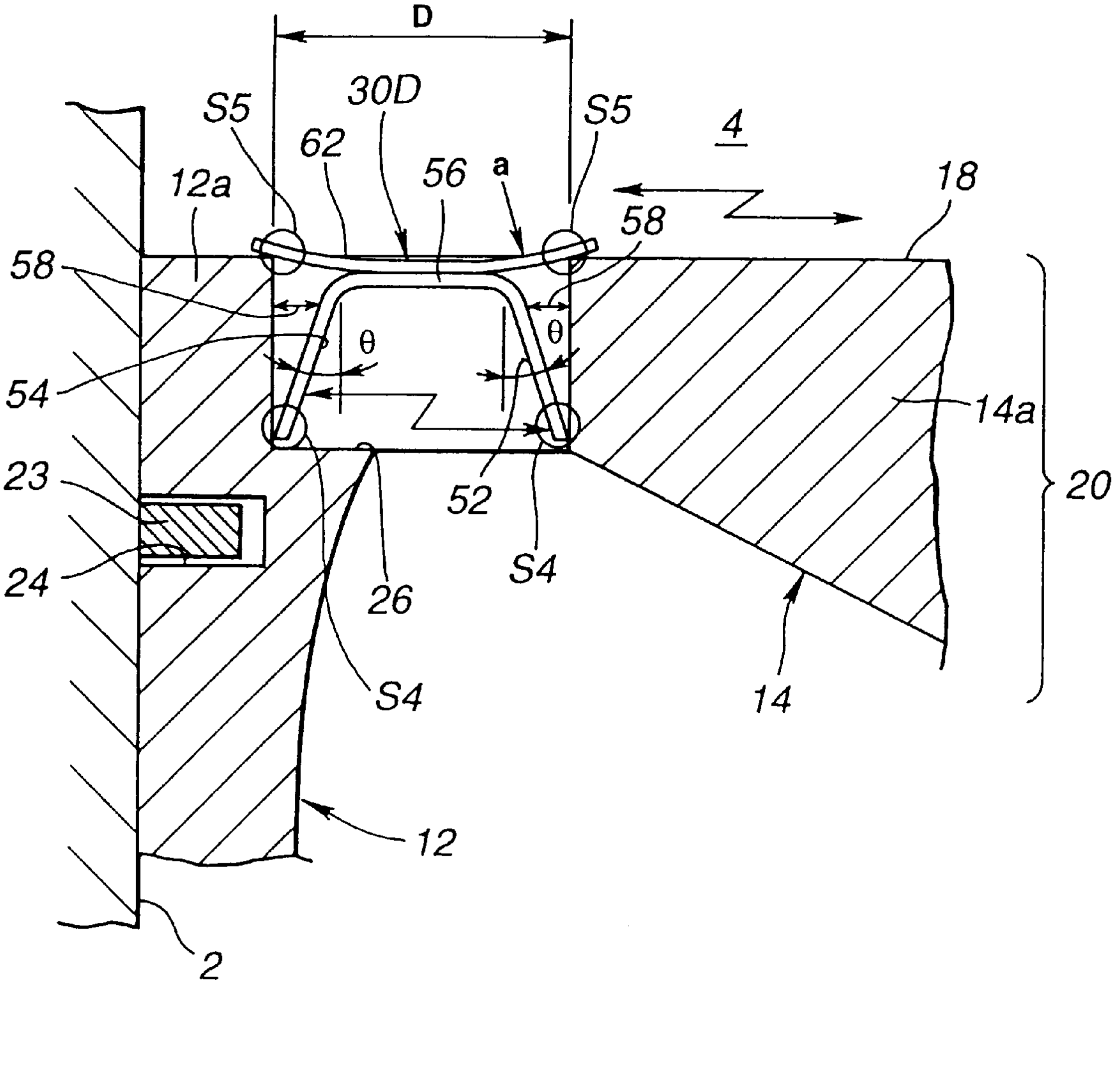
FIG. 11 is an enlarged cross section of the essential part of a fifth embodiment of the piston structure having another thermal-expansion absorption ring (30D).

Referring now to FIG. 11, there is shown a thermal-expansion absorption ring 30D employed in the piston of the fifth embodiment. The thermal-expansion absorption ring 30D of FIG. 11 is made by integrally bonding a circumferentially-extending annular sealing plate (simply a seal plate) 62, constructing part of the piston crown 18, onto the upper face of the top wall portion 56 of a substantially inverted-U-shaped thermal-expansion absorption ring similar to the ring 30C of the third embodiment of FIG. 9. The annular seal plate 62 is slightly downwardly curved in cross section, so that the outer peripheral end (the outer perimeter) of the seal plate 62 is disposed or put on the upper inside edged portion of the rim of the upper skirt portion 12*a* and that the inner peripheral end (the inner perimeter) of the seal plate 62 is disposed or put on the upper outside edged portion of the crown portion 14*a* (see a pair of sliding-contact sections (S5, S5) of FIG. 11). As seen from the left and right sliding-contact sections (S5, S5), the lower face of the outer periphery of the seal plate 62 is in sliding-contact with the upper inside edged portion of the upper skirt portion 12*a*, whereas the lower face of the inner periphery of the seal plate 62 is in sliding-contact with the upper outside edged portion of the crown portion 14*a*. With the arrangement of the thermal-expansion absorption ring 30D, in the presence of thermal expansion of the upper portion 20 of the piston, the radial width of the annular partition groove D becomes shortened with radial deflection of the inverted-U-shaped portion of the thermal-expansion absorption ring 30D and decreased radius-of-curvature of the top seal plate 62. According to the increases in thermal expansion, the inner side wall portion 52 is pressed against the outer peripheral wall surface of the crown portion 14*a* with its reduced inclined angle θ, while the outer side wall portion 54 is pressed against the inner peripheral wall surface of the rim of the upper skirt portion 12*a* with its reduced inclined angle θ. At the same time, the outer perimeter of the seal plate 62 is pressed against the upper inside edged portion of the upper skirt portion 12*a*, while the inner perimeter of the seal plate 62 is pressed against the upper outside edged portion of the crown portion 14*a*. This results in increased gas-tight-fit at each of the tight-fit sections (S4, S4) and the sliding-contact sections (S5, S5). In the fifth embodiment, owing to the provision of the flexible seal plate 62 having a given spring stiffness by which the seal plate 62 is able to recover from the reduced radius-of-curvature of the seal plate heavily loaded and deformed under the combustion pressure to its initial radius-of-curvature obtained in the unloaded or slightly pre-loaded state, in its radial direction as indicated by the arrow a of FIG. 11, the ring 30D of the fifth embodiment has a superior sealing performance than the ring 30C of the third embodiment.

Figure 12:
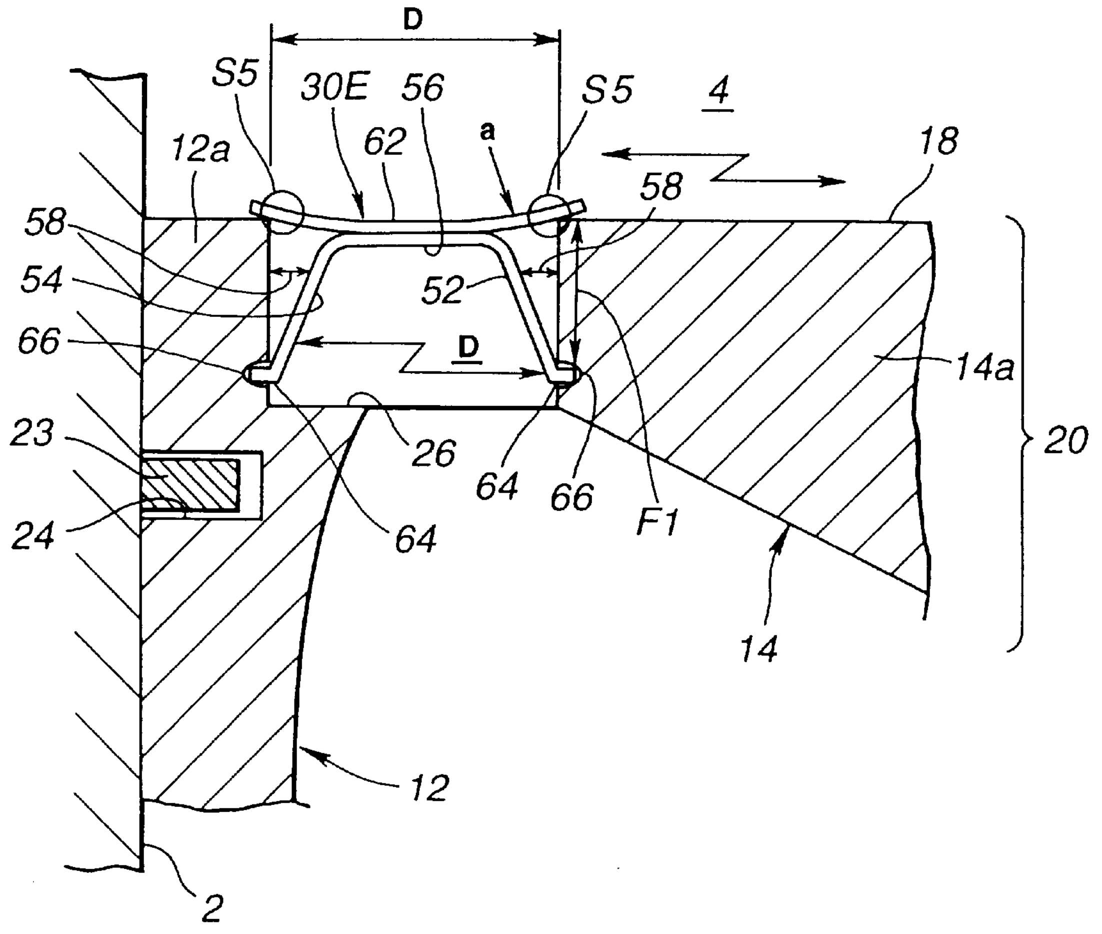
FIG. 12 is an enlarged cross section of the essential part of a sixth embodiment of the piston structure having another thermal-expansion absorption ring (30E).

Referring now to FIG. 12, there is shown a thermal-expansion absorption ring 30E employed in the piston of the sixth embodiment. The thermal-expansion absorption ring 30E of the sixth embodiment (FIG. 12) is similar to the ring 30D of the fifth embodiment (FIG. 11). The ring 30E is slightly different from the ring 30D, in that the lower end of the outer side wall portion 54 is further bent radially outwards by obtuse-angle external bending and the lower end of the inner side wall portion 52 is further bent radially inwards by obtuse-angle external bending, to provide two slightly-radially-flanged portions or slightly-radially-protruding portions (64, 64). A pair of annular recessed portions (66, 66) are formed in the upper-skirt-rimmed-portion inner peripheral wall surface and the crown-portion outer peripheral wall surface, both facing the annular partition groove D of a rectangular cross section. When installing the ring 30E in the annular partition groove D, the inner and outer side wall portions 52 and 54 are elastically deformed, and then the previously-noted flanged portions (64, 64) are fitted or snapped into the respective recessed portions (66, 66). The magnitude of pre-load of the seal plate 62 in the radial direction as indicated by the arrow a or the ability of recovery of the seal plate 62 is changeable depending upon the axial distance (or the depth) F1 from the top face of the piston crown 18 to the recessed portion 66. Additionally, the snap fit between the flanged portions (64, 64) and the recessed portions (66, 66) contributes to prevention of falling of the ring 30E from the annular partition groove D.

Figure 13:
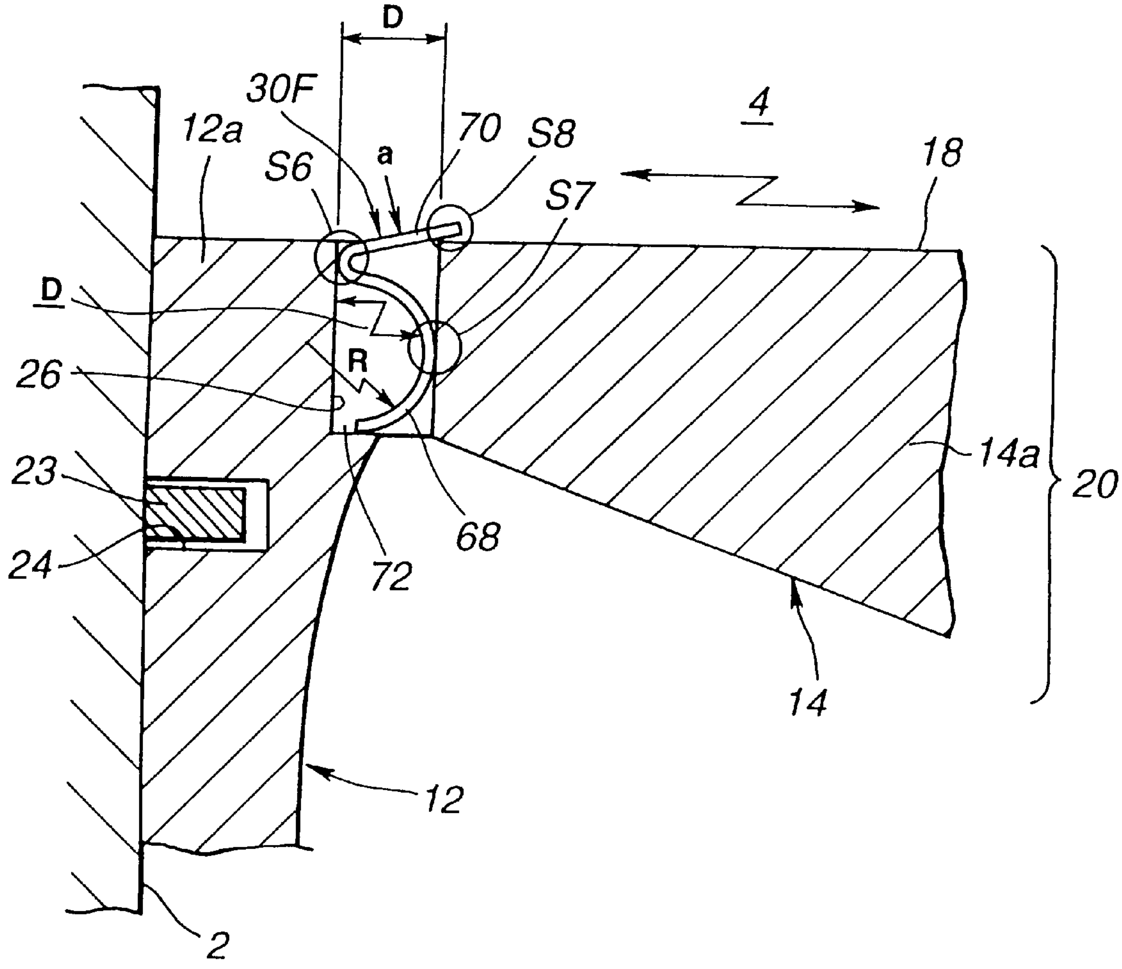
FIG. 13 is an enlarged cross section of the essential part of a seventh embodiment of the piston structure having another thermal-expansion absorption ring (30F).

Referring now to FIG. 13, there is shown a thermal-expansion absorption ring 30F employed in the piston of the seventh embodiment. The thermal-expansion absorption ring 30F of the seventh embodiment is formed into a substantially S shape in cross section by bending sheet metal material having a small spring constant for good flexibility. The ring 30F is composed of a curved surface portion 68 which has a substantially circular-arc shape in cross section and is radially inwardly curved, and a top wall portion 70 bent radially inwards from the upper end of the curved surface portion 68, so that the inner peripheral end (or the inner perimeter) of the top wall portion 70 is disposed or placed on the upper outside edged portion of the crown portion 14*a*. A gas-tight seal for the annular partition groove D is provided by means of a sliding-contact section S6 of the bent portion between the curved surface portion 68 and the top wall portion 70 with the inner peripheral wall surface of the rim of the upper skirt portion 12*a*, a sliding-contact section S7 of the innermost contact surface (the vertex) of the curved surface portion 68 with the outer peripheral wall surface of the crown portion 14*a*, and a sliding-contact section S8 of the lower face of the top wall portion 70 with the upper outside edged portion of the crown portion 14*a*. The lowermost end of the curved surface portion 68 is in radially sliding-contact with the horizontally-circumferentially-extending flat bottom face of the stepped inner peripheral wall section 26 of the upper skirt portion 12*a*. A thermal-deflection absorption clearance 72 is defined between the lowermost end of the curved surface portion 68 and the inner peripheral wall surface of the rim of the upper skirt portion 12*a*, so as to effectively absorb variations in the radial width of the annular partition groove D. With the previously-noted arrangement of the piston structure of the seventh embodiment with the thermal-expansion absorption ring 30F, in the presence of thermal expansion of the upper portion 20 of the piston, the ring 30F is deformable or deflectable about the sliding-contact section S7 serving as a fulcrum, with changes in the radius-of-curvature R of the curved surface portion 68. Thus, the shrinkage of the radial width of the annular partition groove D can be effectively absorbed by deformation of the ring 30F. Actually, the ring 30F is able to deflect until the thermal-deflection absorption clearance 72 becomes decreased to zero. In the presence of positive and negative radial deflections of the ring 30F, the sliding-contact section S6 slides up and down, and simultaneously the inner peripheral end of the top wall portion 70 slides radially inwards and outwards at the sliding-contact section S8, thereby effectively absorbing both thermal-expansion and thermal-contraction. In the seventh embodiment, although the thermal-expansion absorption ring 30F having a substantially S shape in cross section is used, a thermal-expansion absorption ring having a substantially inverted S shape (a mirror image of the ring 30F of FIG. 13) may be used.

Figure 14:
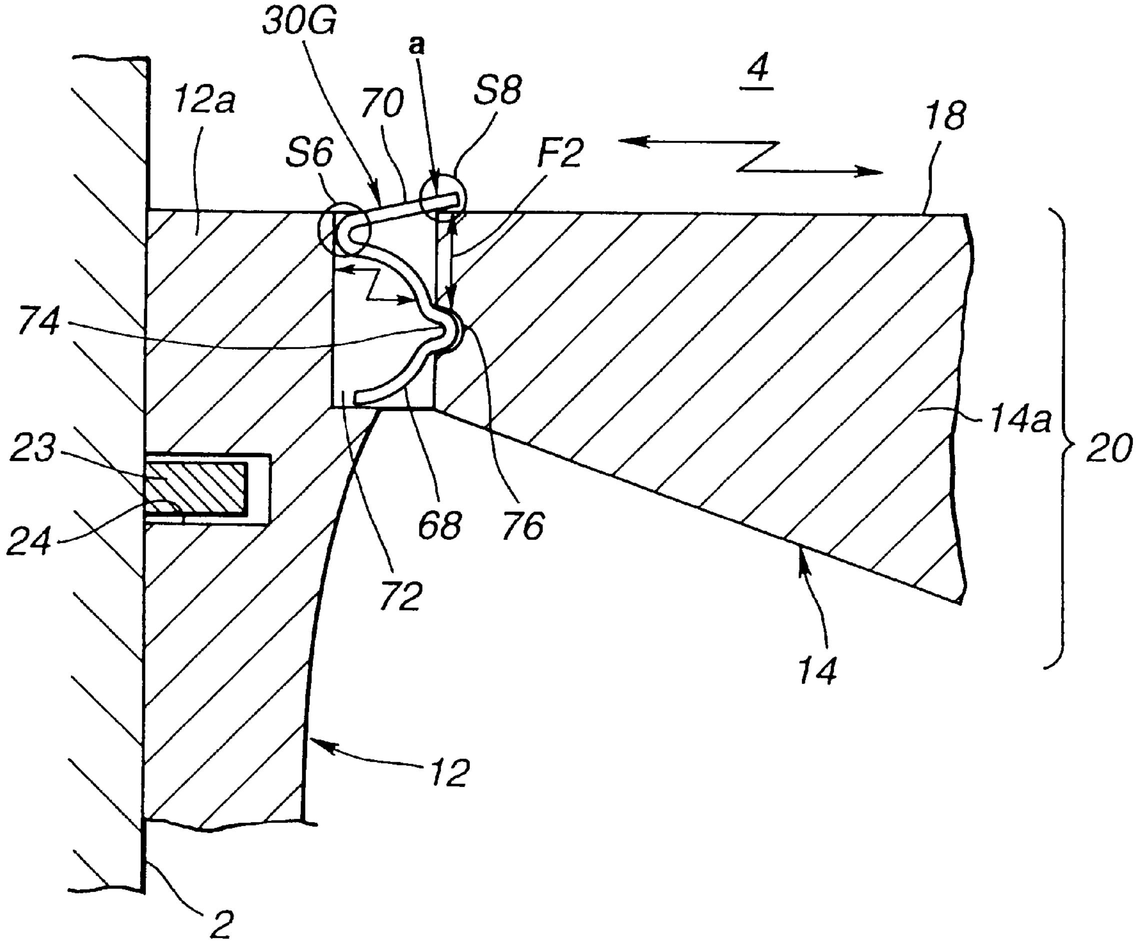
FIG. 14 is an enlarged cross section of the essential part of an eighth embodiment of the piston structure having another thermal-expansion absorption ring (30G).

Referring now to FIG. 14, there is shown a thermal-expansion absorption ring 30G employed in the piston of the eighth embodiment. The thermal-expansion absorption ring 30G of the eighth embodiment (FIG. 14) is similar to the ring 30F of the seventh embodiment (FIG. 13). The ring 30G is slightly different from the ring 30F, in that the curved surface portion 68 is formed at its innermost contact point with a circumferentially-extending, radially-inwardly raised portion or protruding portion 74 having a small circular-arc shape in cross section, and also the crown portion 14*a* is formed in its cylindrical side wall with a circumferentially-extending recessed portion 76 having a substantially semi-circle in cross section. When installing the ring 30G in the annular partition groove D, the curved wall portion 68 is elastically deformed, and then the above-mentioned raised portion 74 is fitted or snapped into the recessed portion 76. The snap fit between the raised portion 74 and the recessed portion 76 contributes to prevention of falling of the ring 30G from the annular partition groove D. The magnitude of pre-load of the top wall portion 70, being in sliding-contact with the upper outside edged portion of the crown portion 14*a* with a specified preload acting in a radial direction as indicated by the arrow a, or the ability of recovery of the top wall portion 70 is changeable depending upon the axial distance (or the depth) F2 from the top face of the piston crown 18 to the recessed portion 76. As discussed above, in the eighth embodiment, the thermal-expansion absorption ring 30G having a substantially S shape in cross section is used and the raised portion 74 of the curved wall portion 68 is fitted to the recessed portion 76 formed in the cylindrical side wall of the crown portion 14*a*. Alternatively, a thermal-expansion absorption ring may has a substantially inverted S shape (a mirror image of the ring 30G of FIG. 14), and additionally a raised portion 74 of a curved wall portion 68 may be fitted to a recessed portion formed in the inner peripheral wall surface of the rim of the upper skirt portion 12*a*.

Figure 26:
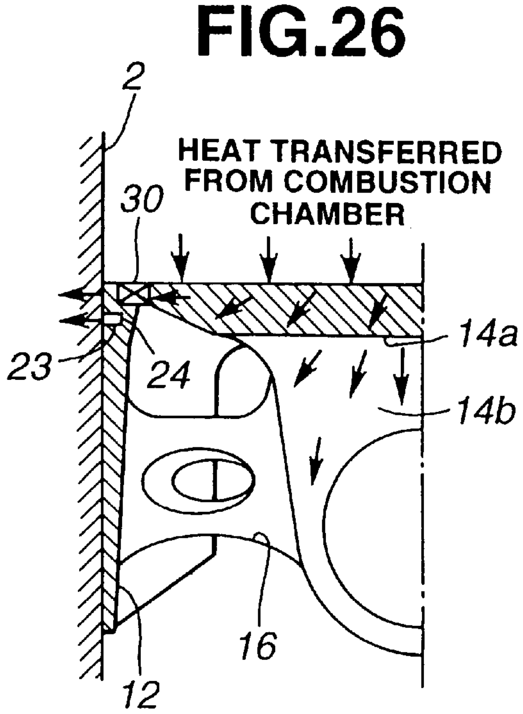
FIG. 26 is a cross section showing the flow of heat transferred from the combustion chamber to the piston.

Heat transfer or heat flow of the piston structure of the invention is hereunder discussed in reference to FIGS. 8 and 26. As explained above, the piston structure of the second embodiment shown in FIG. 8 has the annular partition groove D partitioning the top portion of the piston into the rim of the upper skirt portion 12*a* and the piston crown portion 14*a*, and a thermal-expansion absorption ring 30 (30B) fitted to the annular partition groove D, and a property of the piston material having a high heat conductivity can be effectively suppressed, while properly absorbing or controlling the thermal-expansion or thermal-contraction occurring in the top end of the piston. This enhances the temperature-rise property of the crown portion 14*a*, constructing the most part of the piston crown 18. After the temperature rise in the top end of the piston, the terminal temperature or balanced temperature of the crown portion 14*a* of the piston tends to easily become high, whereby atomization or vaporization of the unburned fuel can be promoted, thus reducing exhaust emissions. As seen in FIG. 26, during the engine operation, a small amount of heat produced in the combustion chamber is transferred from the combustion chamber through the crown portion 14*a* and then radiated by way of an oil passage 80 (described later) provided in the thermal-expansion absorption ring 30. Also, the sole piston ring 23 and the lubricating-oil film between the piston skirt surface and the cylinder wall transfer some of the piston heat to the cylinder wall 2. A large amount of heat in the combustion chamber flows from the top surface of the piston through the crown portion 14*a* to the piston-pin boss portions (14*b*, 14*b*). As a result of this, there is a tendency of excessive temperature-rise at the pin boss portions (14*b*, 14*b*). Usually, the piston pin must be loose in the piston to provide adequate freedom for movement between the piston and pin. The higher the temperature of lubricating oil, the lower the coefficient of viscosity of the lubricating oil. Thus, in presence of excessive temperature-rise at the piston-pin bosses, the thickness of a required hydrodynamic-lubrication oil film cannot be maintained. As a result, the piston life is reduced owing to lowered durability of the piston. For the reasons set forth above, the piston structure described in the following ninth (FIGS. 15 and 16) to fourteenth (FIGS. 23 and 24) embodiments, has a thermal-expansion absorption ring with a cooling passage and hole capable of efficiently utilizing lubricating oil (cooling oil) fed from underneath the piston for effective suppression of excessive temperature-rise in the upper portion 20 of the piston. For example, the above-mentioned lubricating oil (cooling oil) could be generally injected from a piston oil jet (not shown) installed in the inside of the crankcase. Each of the ninth to fourteenth embodiments (FIGS. 15–24) has a thermal-expansion absorption ring structure similar to the thermal-expansion absorption ring 30B of the second embodiment (FIG. 8), except that each of the ninth to fourteenth embodiments has a thermal-expansion absorption ring with a cooling passage and hole. Thus, the same reference signs used to designate elements in the piston structure shown in FIG. 8 will be applied to the corresponding elements used in the ninth to fourteenth embodiments shown in FIGS. 15 through 24, for the purpose of comparison among these embodiments.

Figure 15:
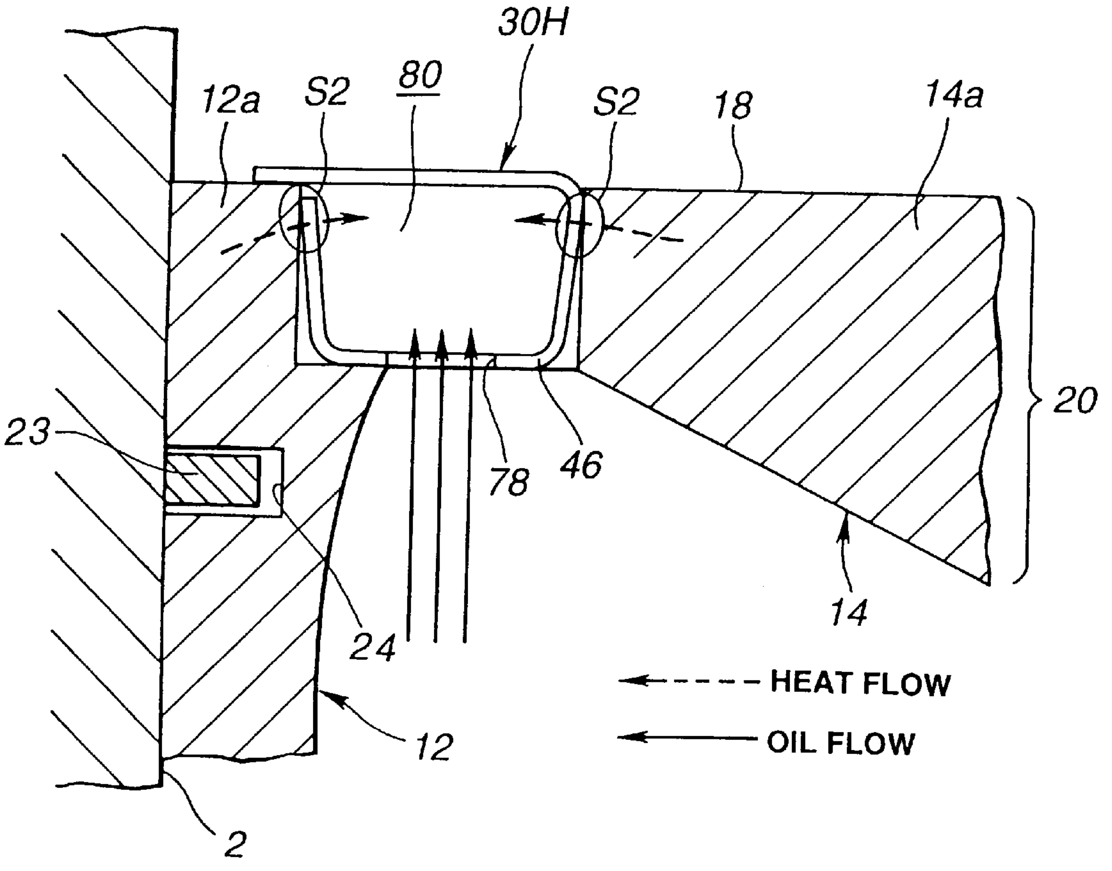
FIG. 15 is an enlarged cross section of the essential part of a ninth embodiment of the piston structure having another thermal-expansion absorption ring (30H) with an oil hole (78) and an oil passage (80).
Figure 16:
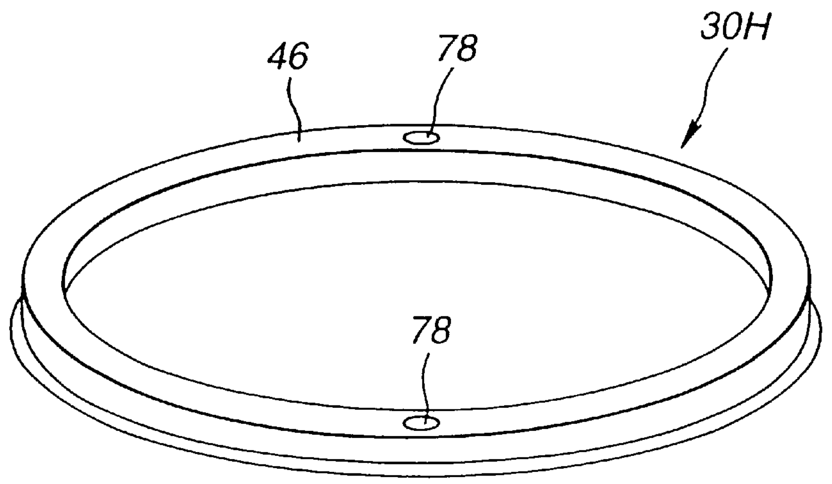
FIG. 16 is a perspective view of the thermal-expansion absorption ring (30H) shown in FIG. 15.

Referring now to FIGS. 15 and 16, there is shown a thermal-expansion absorption ring 30H employed in the piston of the ninth embodiment. The thermal-expansion absorption ring 30H of the ninth embodiment has an annular hollow of a substantially inverted trapezoidal section, such that the annular hollow of the ring 30H defines a circumferentially-extending oil passage 80. As seen in FIGS. 15 and 16, the ring 30H is formed in its bottom wall portion 46 with a pair of diametrically-opposing oil holes (78, 78) communicating the oil passage 80. During the engine operation, one of the oil holes (78, 78) mainly serves as an oil-supply hole which introduces lubricating oil within toward the oil passage 80, while the other hole mainly serves as an oil-return hole which exhausts the lubricating oil from the oil passage 80 to the underside of the piston. With the previously-discussed arrangement of the ninth embodiment, when some of lubricating oil (cooling oil) injected toward the upper portion 20 of the piston by way of the piston oil jet, is introduced through the oil hole 78 into the oil passage

80. The lubricating oil incoming through one of the oil holes circulates within the oil passage 80, and thereafter returns via the other oil hole toward the underside of the piston. By virtue of the lubricating oil circulating circumferentially within the oil passage 80, heat transfer between the crown portion 14*a* and the upper skirt portion 12*a* via the tight-fit sections (S2, S2) is attained. The size of the oil hole 78, that is, the amount of lubricating oil circulating within the oil passage 80 is experimentally determined from the viewpoint of proper temperature-rise control at both the crown portion 14*a* and the upper skirt portion 12*a*. Thus, the undesired excessive temperature-rise at both the upper skirt portion 12*a* and the crown portion 14*a* can be effectively suppressed.

Figure 17:
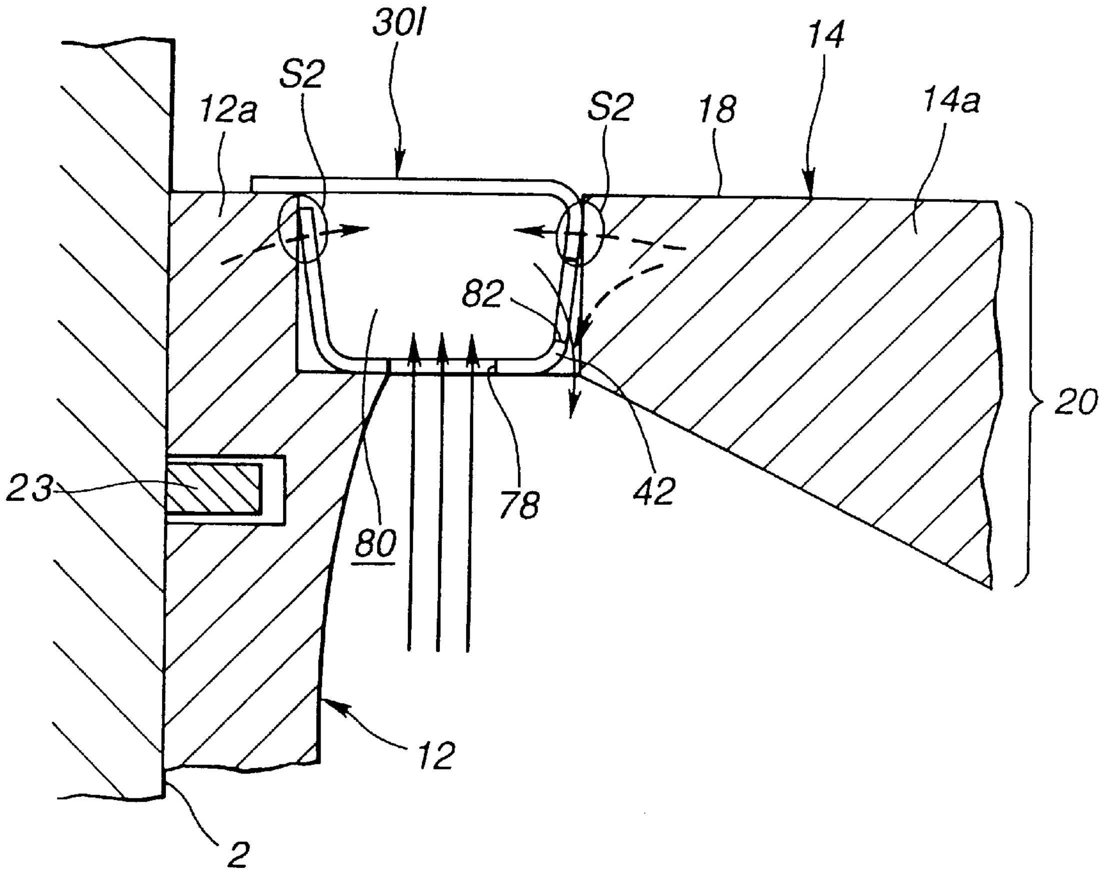
FIG. 17 is an enlarged cross section of the essential part of a tenth embodiment of the piston structure having another thermal-expansion absorption ring (30I) with an auxiliary oil hole (82) as well as the oil hole (78) and the oil passage (80).
Figure 18:
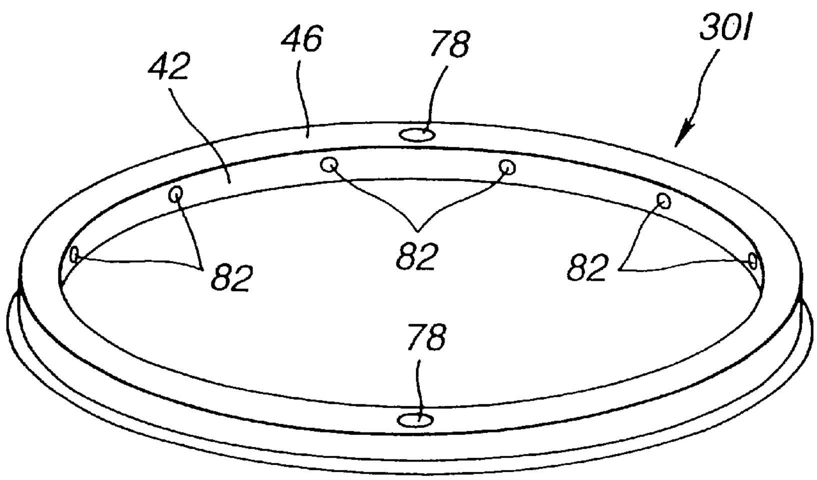
FIG. 18 is a perspective view of the thermal expansion absorption ring (30I) shown in FIG. 17.

Referring now to FIGS. 17 and 18, there is shown a thermal-expansion absorption ring 30I employed in the piston of the tenth embodiment. As can be appreciated from structural comparison between the two thermal-expansion absorption rings 30H and 30I shown in FIGS. 16 and 18, a plurality of circumferentially equi-distant spaced auxiliary oil holes 82 are also provided in the inside wall portion 42 of the ring 30I, so that the auxiliary oil holes 82 intercommunicates the oil passage 80 and the thermal-deflection absorption clearance 50 (see FIG. 8). With the arrangement of the tenth embodiment, the lubricating oil injected toward the upper portion 20 of the piston is introduced through the oil hole 78 into the oil passage 80, and then circulates circumferentially within the oil passage 80, and thereafter exhausted properly through the auxiliary oil holes 82 as well as the oil hole 78. At this time, as may be appreciated from heat flow (indicated by the broken line) orienting from the crown portion 14*a* towards the thermal-deflection absorption clearance 50, direct heat-transfer between the crown portion 14*a* and lubricating oil leaked from the auxiliary oil holes 82 can be achieved, whereby the temperature-rise of the crown portion 14*a* can be more effectively suppressed.

Figure 19:
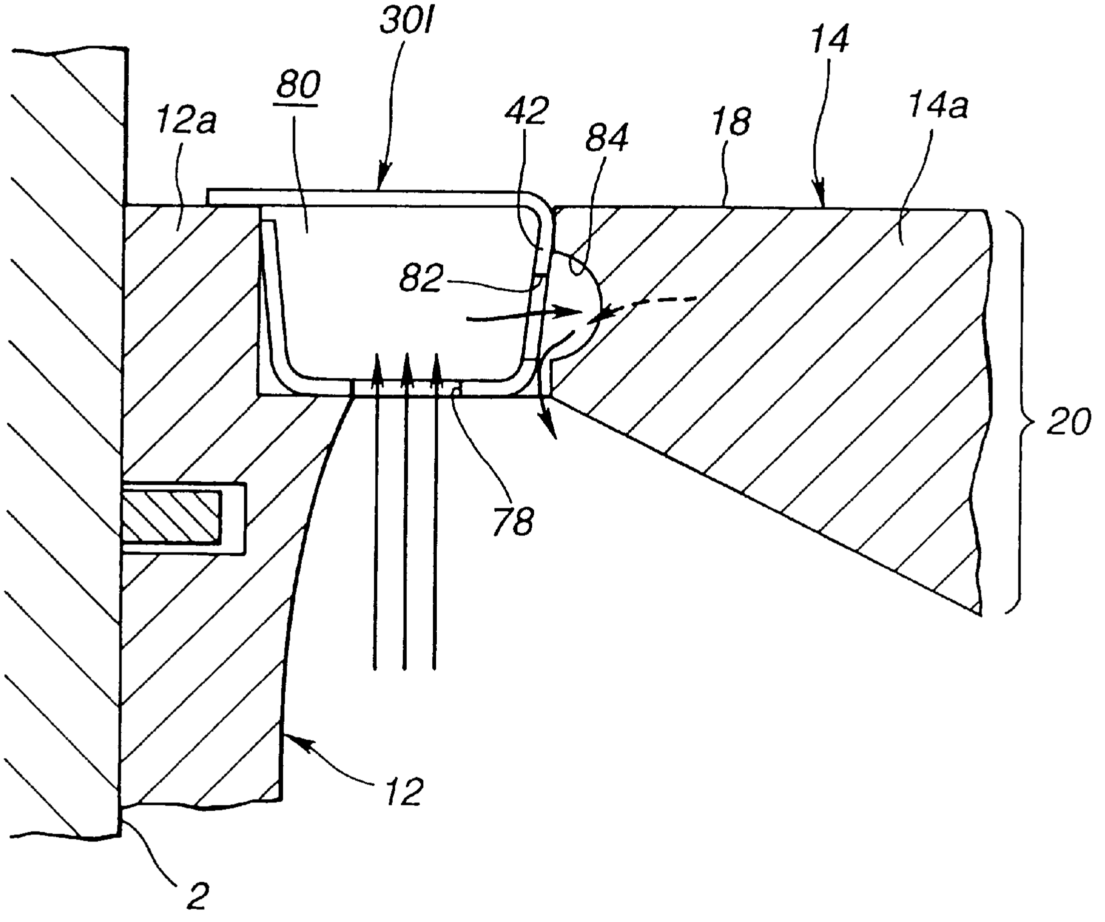
FIG. 19 is an enlarged cross section of the essential part of an eleventh embodiment of the piston structure having the thermal-expansion absorption ring (30I) shown in FIG. 17 and an oil receiving portion (84).

Referring now to FIG. 19, there is shown the piston of the eleventh embodiment having the same thermal-expansion absorption ring 30I as the tenth embodiment and an additional oil receiving or capturing portion 84. The oil receiving portion 84 is formed in the cylindrical side wall of the crown portion 14*a* in such a manner as to oppose the auxiliary oil holes 82. In the shown embodiment, the oil receiving portion 84 is formed as an annular groove having a substantially semi-circle in cross section and extending continually all around the circumference of the piston crown. Alternatively, the oil receiving portion 84 may be formed in the cylindrical side wall of the crown portion 14*a* as a plurality of circumferentially equi-distant spaced semi-spherical recessed portions opposing the respective auxiliary oil holes 82. Such an oil receiving portion 84 is formed for example by machining or a core used for casting. In the case of the piston structure of the eleventh embodiment shown in FIG. 19, there is an increased tendency for some of lubricating oil exhausted out of the oil passage 80 through the auxiliary oil holes 82 to stay within the oil receiving portion 84. Additionally, the oil receiving portion 84 results in an increased surface area of the cylindrical side wall of the crown portion 14*a*, that is, an increased heat-conductivity area for heat transfer from the crown portion 14*a* to the lubricating oil. This ensures a more effective temperature-drop at the crown portion 14*a*.

Figure 20:
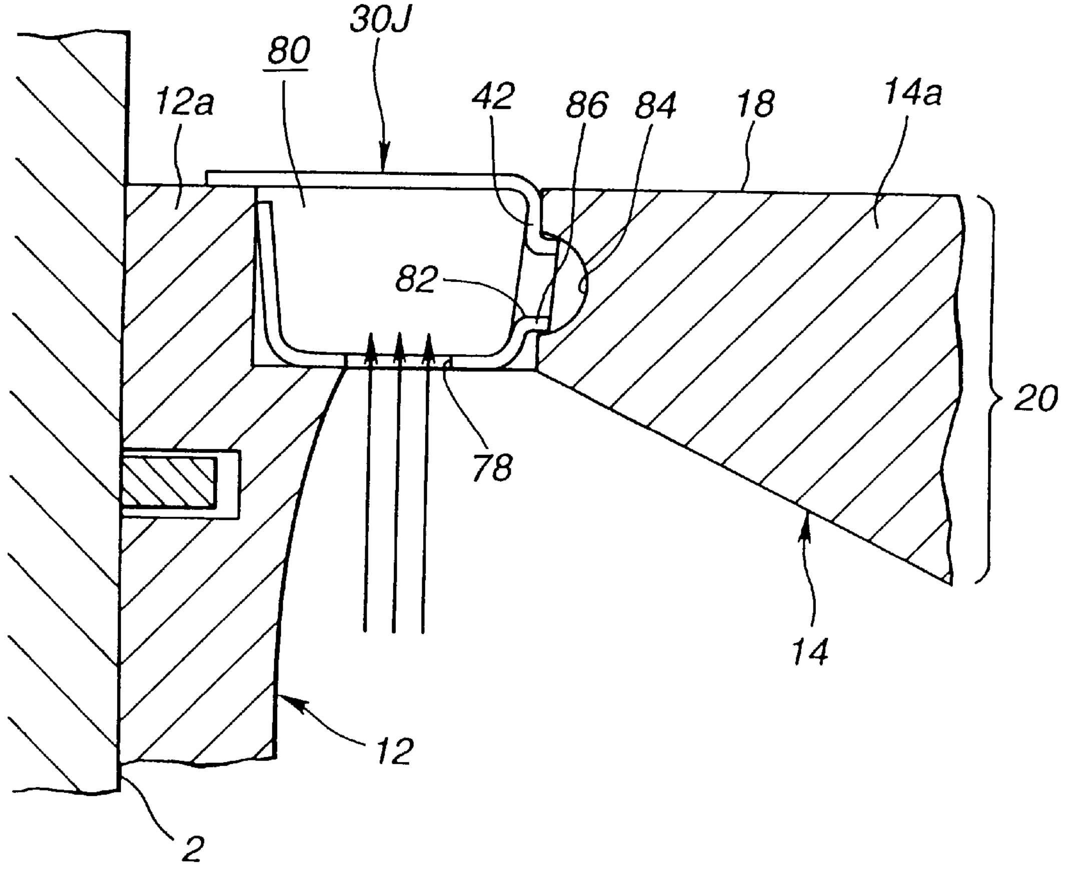
FIG. 20 is an enlarged cross section of the essential part of a twelfth embodiment of the piston structure having another thermal-expansion absorption ring (30J) with a projected or hole-flanged portion (86) fitted to the oil receiving portion (84).
Figure 21:
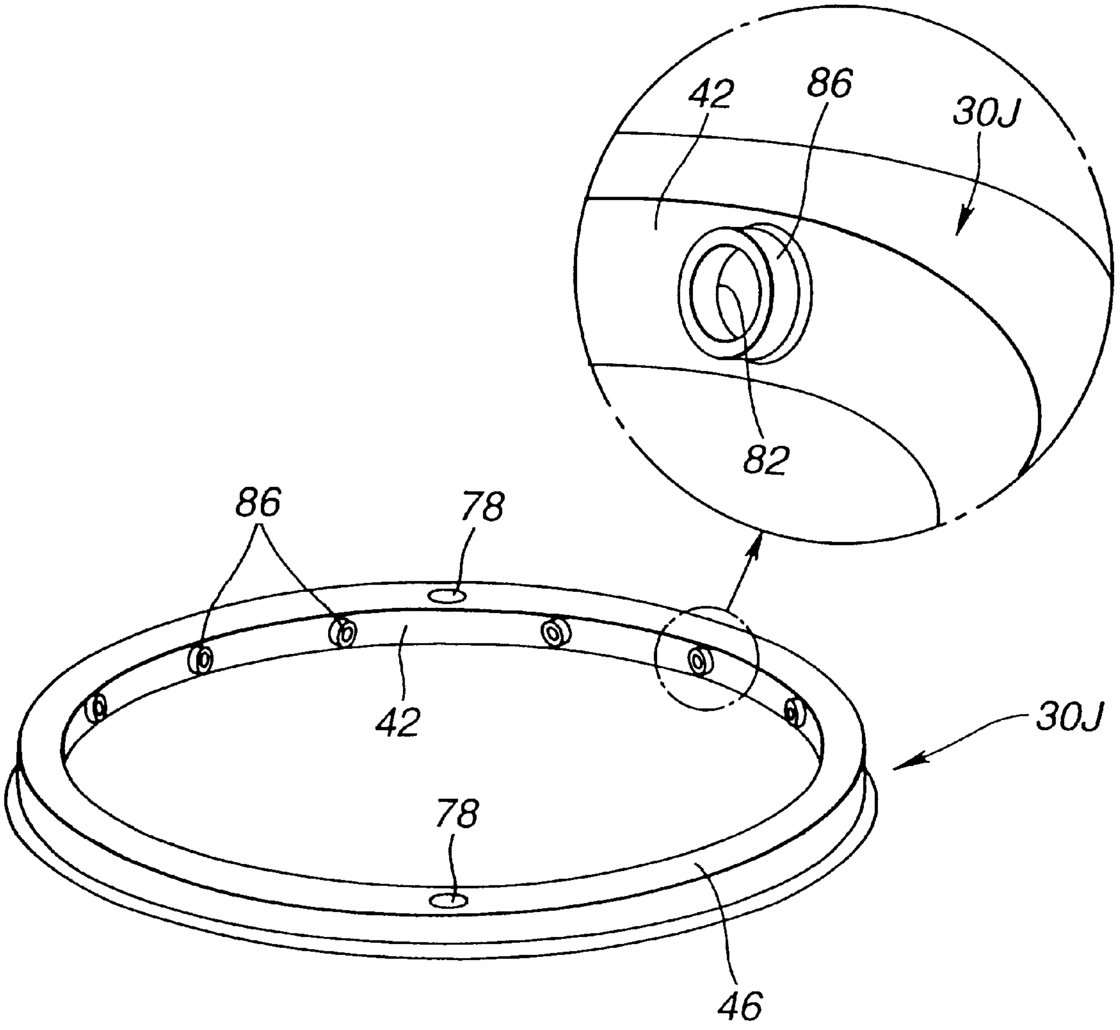
FIG. 21 is a perspective view of the thermal expansion absorption ring (30J) shown in FIG. 20.

Referring now to FIGS. 20 and 21, there is shown a thermal-expansion absorption ring 30J employed in the piston of the twelfth embodiment. The thermal-expansion absorption ring 30J of the twelfth embodiment has a plurality of circumferentially equi-distant spaced hole-flanged (or burred) portions 86 formed in the inner side wall portion 42, in such a manner as to project or fit into the oil receiving portion 84. Each of the hole-flanged portions 86 has an auxiliary oil hole 82 communicating the oil passage 80. By virtue of the fitting of the hole-flanged portions 86 into the oil receiving portion 84, it is possible to stably mount the thermal-expansion absorption ring 30J on the annular partition groove D and to fit to the inner crown-plus-boss portion 14, thus certainly preventing the ring 30J from falling out of the annular partition groove D by inertia force of the piston during the engine operation.

Figure 22:
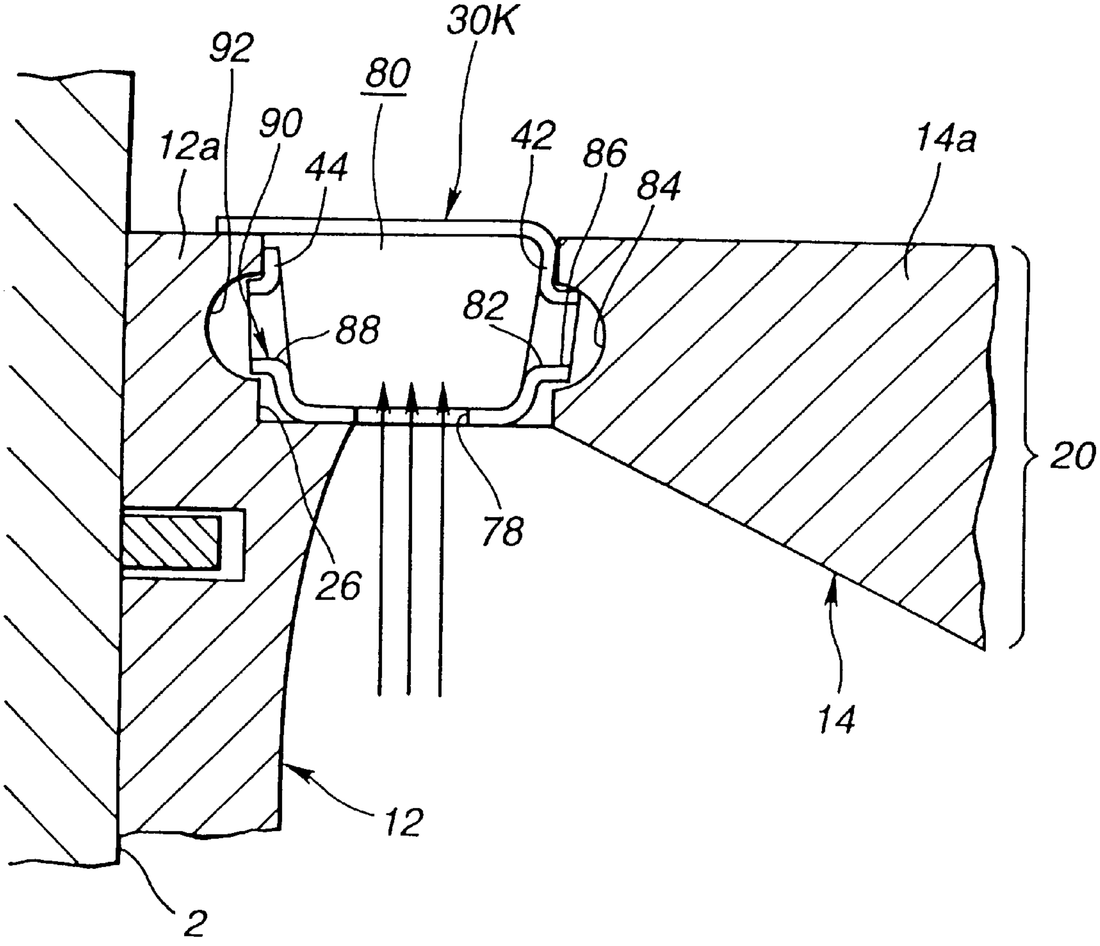
FIG. 22 is an enlarged cross section of the essential part of a thirteenth embodiment of the piston structure having another thermal-expansion absorption ring (30K) with a hole-flanged portion (90) fitted to an oil receiving portion (92) formed in the upper portion of the skirt, as well as the hole-flanged portion (86) fitted to the oil receiving portion (84) formed in the circumference of the piston crown.

Referring now to FIG. 22, there is shown a thermal-expansion absorption ring 30K employed in the piston of the thirteenth embodiment. The thermal-expansion absorption ring 30K of the thirteenth embodiment has the same circumferentially equi-distant spaced hole-flanged (or burred) portions 86 formed in the inner side wall portion 42 and fitted to the oil receiving portions 84 of the crown portion 14*a*, as compared to those of the twelfth embodiment. As to the ring 30K, a plurality of circumferentially equi-distant spaced hole-flanged (or burred) portions 90 are further formed in the outer side wall portion 44. Each of the hole flanged portions 90 has an auxiliary oil hole 88. An oil receiving portion 92 is also provided in the inner peripheral wall surface of the rim of the upper skirt portion 12*a*. When assembling the ring 30K in the annular partition groove D, the circumferentially equidistant spaced hole-flanged portions 90 of the outer side wall portion 44 are fitted to the oil receiving portion 92 of the upper piston skirt, whereas the hole-flanged portions 86 of the inner side wall portion 42 are fitted to the oil receiving portion 84 of the crown portion 14*a*. In the thirteenth embodiment, the oil receiving portion 92 is formed in the inner peripheral wall of the rim of the upper skirt portion 12*a* as a plurality of circumferentially equi-distant spaced semi-spherical recessed portions opposing the respective hole-flanged portions 90. The additional hole-flanged portions 90 and oil receiving portions 92 cooperate with each other to effectively suppress temperature rise of the upper skirt portion 12*a*. By the provision of the hole-flanged portions 90 fitted into the oil receiving portions 92 as well as the hole-flanged portions 86 fitted into the oil receiving portions 84, it is possible to more stably mount the thermal-expansion absorption ring 30K on the annular partition groove D and to fit to the inner crown-plus-boss portion 14, thus more certainly preventing the ring 30K from falling out of the annular partition groove D during reciprocating motion of the piston.

Figure 23:
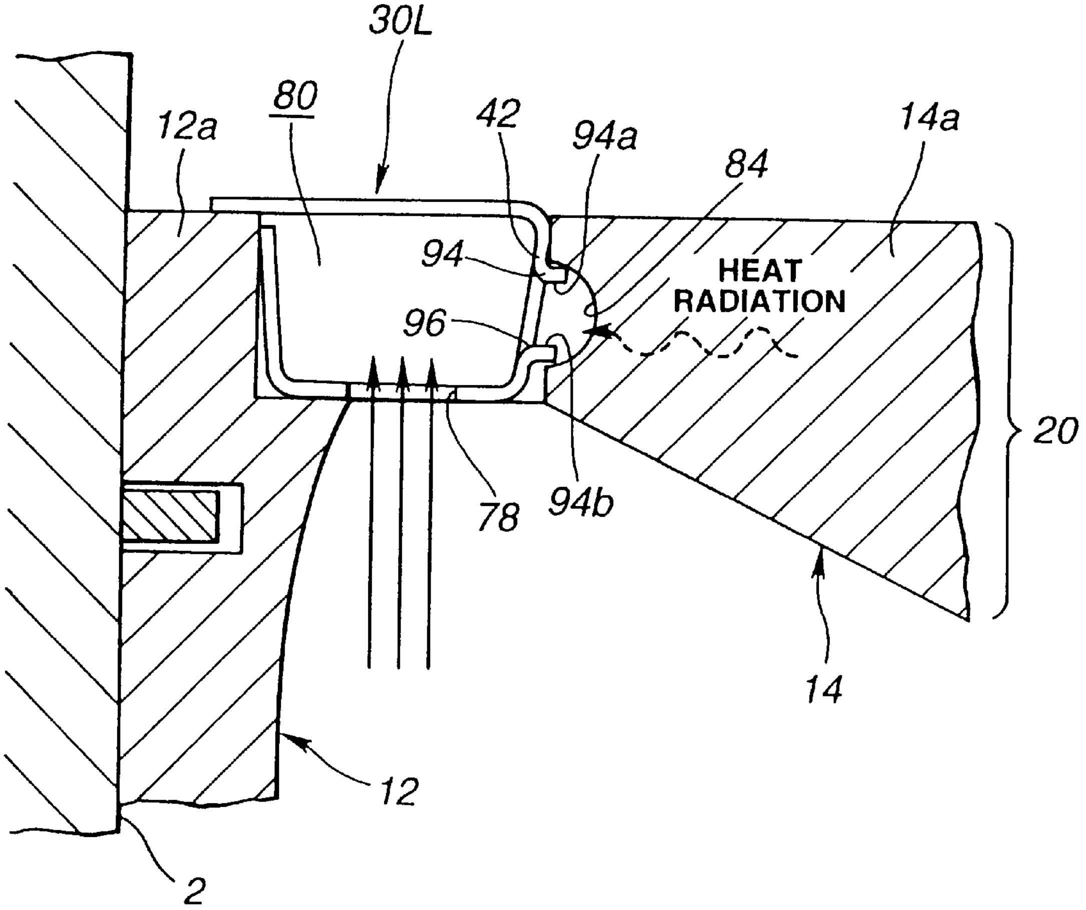
FIG. 23 is an enlarged cross section of the essential part of a fourteenth embodiment of the piston structure having another thermal-expansion absorption ring (30L) with a projected or upper-and-lower flanged portion (94) fitted to the oil receiving portion (84) formed in the circumference of the piston crown.
Figure 24:
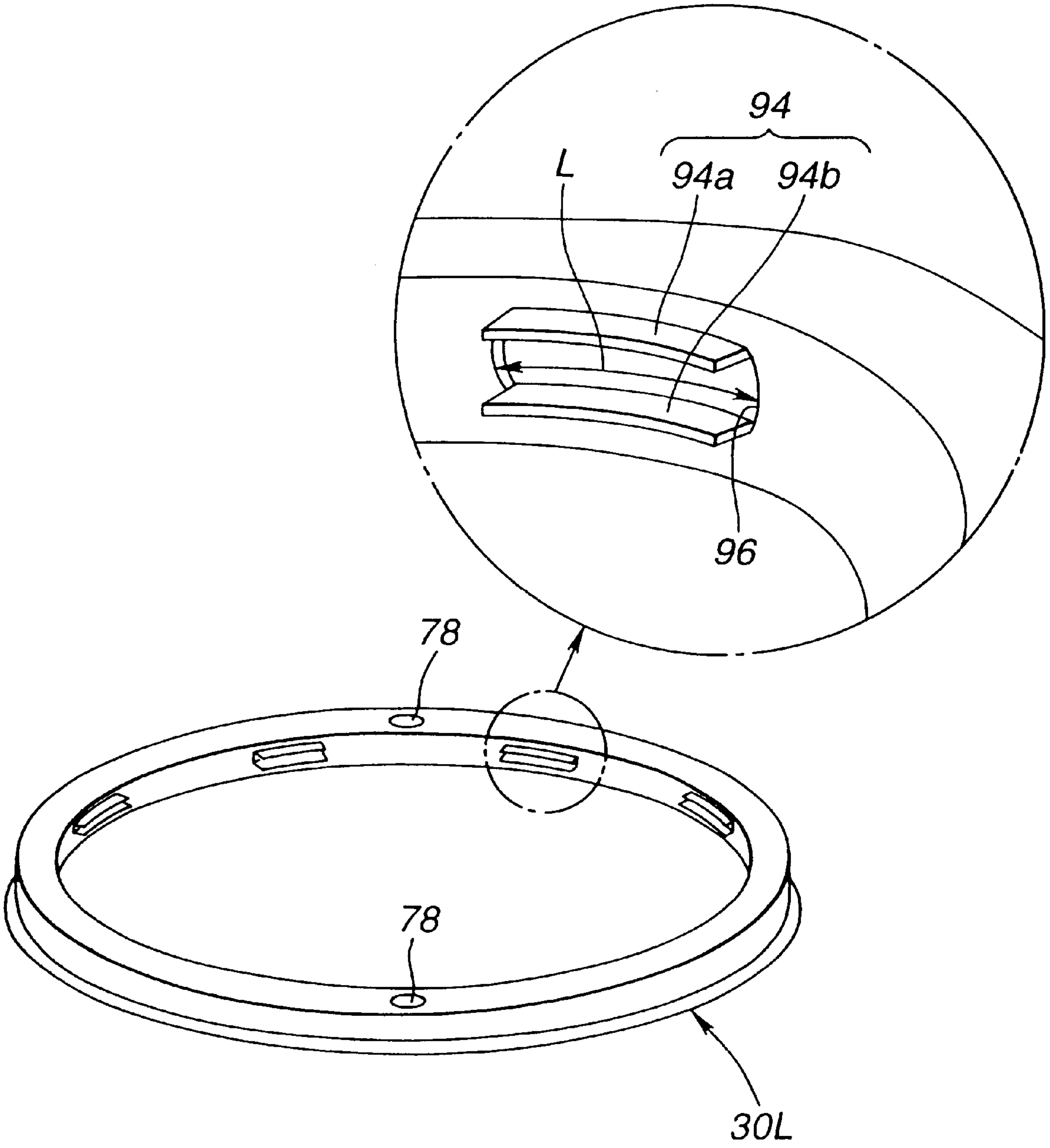
FIG. 24 is a perspective view of the thermal expansion absorption ring (30L) shown in FIG. 23.

Referring now to FIGS. 23 and 24, there is shown a thermal-expansion absorption ring 30L employed in the piston of the fourteenth embodiment. As best seen in FIG. 23, the oil receiving portion 84 of the crown portion 14*a* of the fourteenth embodiment is formed as an annular groove having a substantially semi-circular cross section and extending continually all around the circumference of the piston crown. A slotted, radially-protruding portion 94 fitted to the oil receiving portion 84 is formed in the inner side wall portion 42 of the ring 30L as a plurality of circumferentially equi-distant slotted portions each having a curved slot 96 serving as an auxiliary oil hole, and a pair of radially-inwardly protruding upper and lower flanges 94*a* and 94*b* parallel to each other. The upper and lower flanges of the projected portion 94 are fitted to the oil receiving portion 84. The slotted portion 94 can be easily formed by way of pressing. The proper fitting between the upper and lower flanges 94a and 94b of the respective slotted portion 94 and the oil receiving portion 84 prevents the ring 30L from falling out of the annular partition groove D. Additionally, a heat-radiation property of the crown portion 14*a* can be easily adjusted by properly changing the length L of the slot (or the auxiliary oil hole) 96. For example, as the circumferential length L of the slot 96 increases, the opening area of the auxiliary oil hole becomes greater, and thus a cooling effect of the crown portion 14*a* can be enhanced. It is possible to equalize a temperature distribution of the piston crown 18, by more precisely adjusting the length L for each of the slots 96 while accounting for the temperature distribution of the piston crown 18.

Figure 25A:
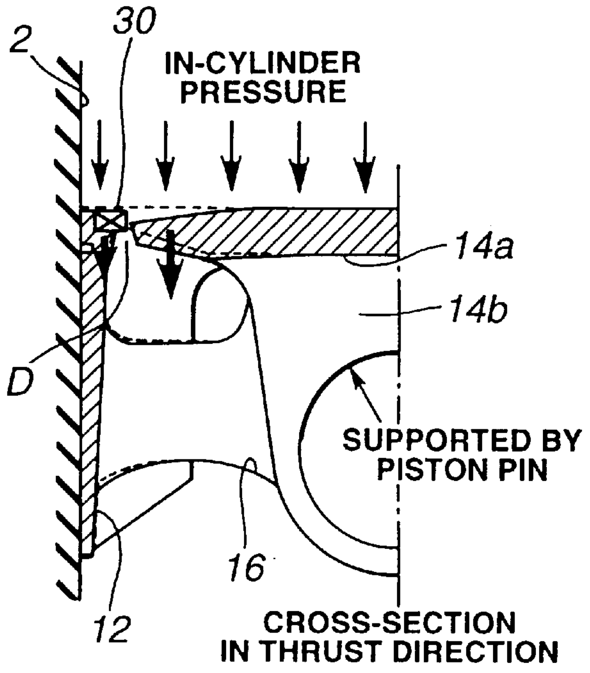
FIGS. 25A and 25B are cross-sectional views explaining deflection of the piston crown portion under in-cylinder pressure (combustion pressure), cut in the side-thrust direction and in the piston-pin direction, respectively.
Figure 25B:
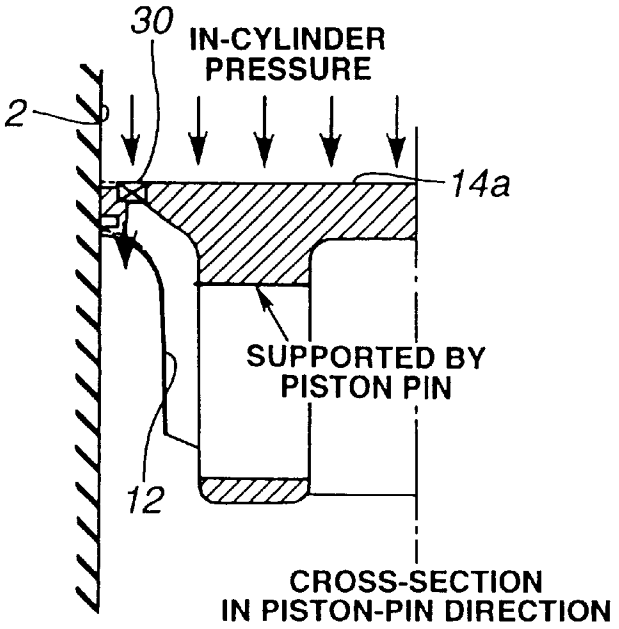

As set out above, in order to provide proper thermal-expansion and thermal-contraction control without providing the thermal-expansion control clearance defined between the cylinder wall and the top end of the piston, the piston of the invention is split at its top end into the rim of the upper skirt portion 12*a* of the substantially cylindrical, thin-walled outer piston skirt 12 and the crown portion 14*a* of the inner crown-plus-boss portion 14. Thus, as shown in FIGS. 25A and 25B, when the in-cylinder pressure (combustion pressure) builds up in the combustion chamber during operation of the engine, it strongly pushes the piston crown 18. Owing to the in-cylinder pressure loading on the piston crown 18, the perimeter of the crown portion 14*a* tends to deflect or deform downwards. The inner crown-plus-boss portion 14 is supported by means of the piston pin, and therefore the maximum deformation of the perimeter of the crown portion 14*a* takes place in the side-thrust direction (see FIG. 25A) perpendicular to the piston-pin direction (see FIG. 25B). Owing to deformation of the perimeter of the crown portion 14*a*, there is a possibility that the sealing performance of the thermal-expansion absorption ring 30 fitted to the annular partition groove D is reduced. Also, such deformation of the perimeter of the crown portion 14*a* may disturb adequate heat transfer from the piston crown to the tight-fit sections (S2, S2) and to the lubricating oil flowing through the oil passage 80, and whereby the accuracy of the piston temperature control will be decreased. In controlling the piston temperature and in providing adequate mechanical strength at a minimum weight, the following piston structures of the fifteenth to nineteenth embodiments (see FIGS. 27A–33B) are superior.

Figure 27A:
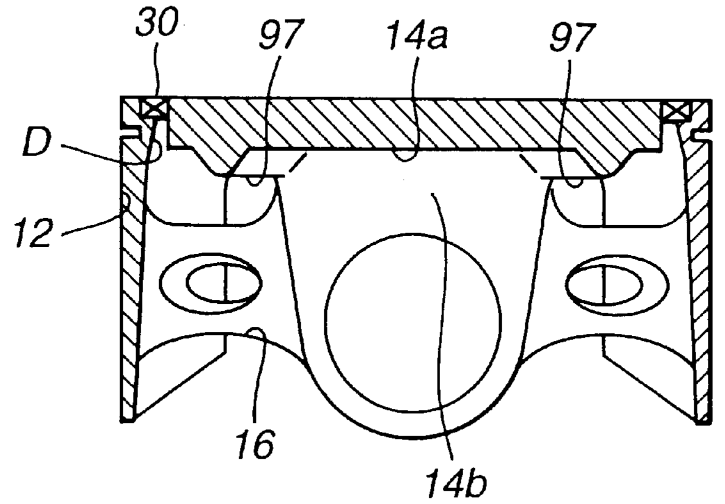
FIGS. 27A and 27B respectively show the cross section in the thrust direction and the bottom view of a fifteenth embodiment of the piston structure.
Figure 27B:
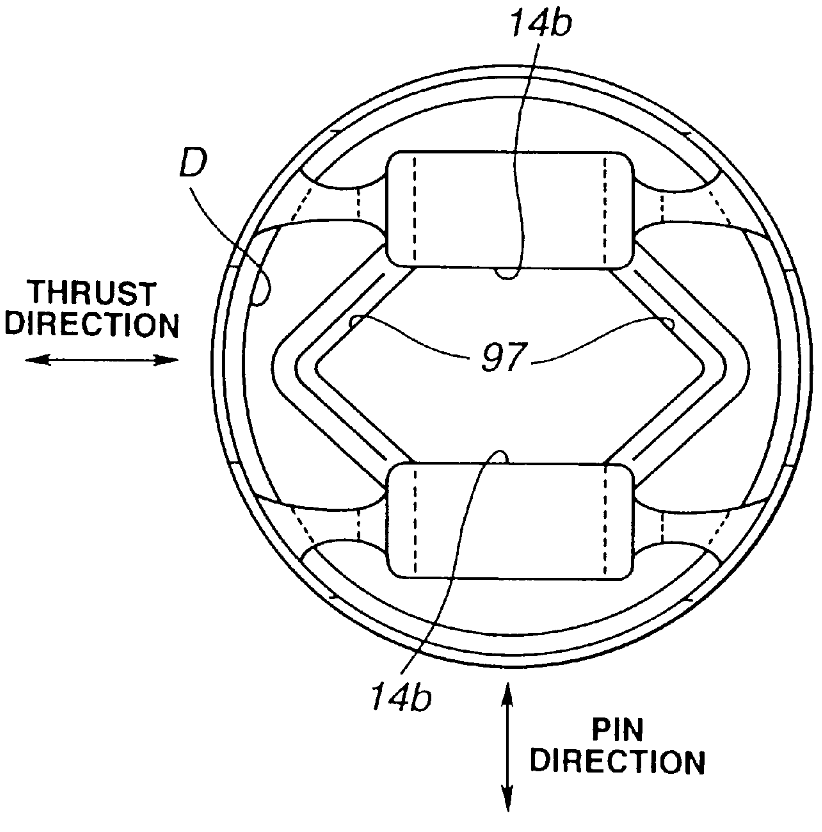
Figure 28:
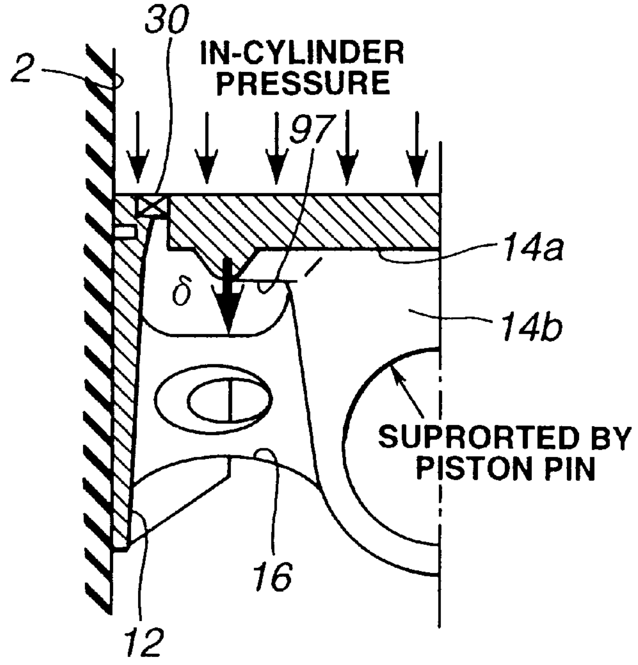
FIG. 28 is a cross section explaining enhanced rigidity of deflection of the piston crown portion of the ribbed piston of the fifteenth embodiment shown in FIGS. 27A and 27B.
Figure 29:
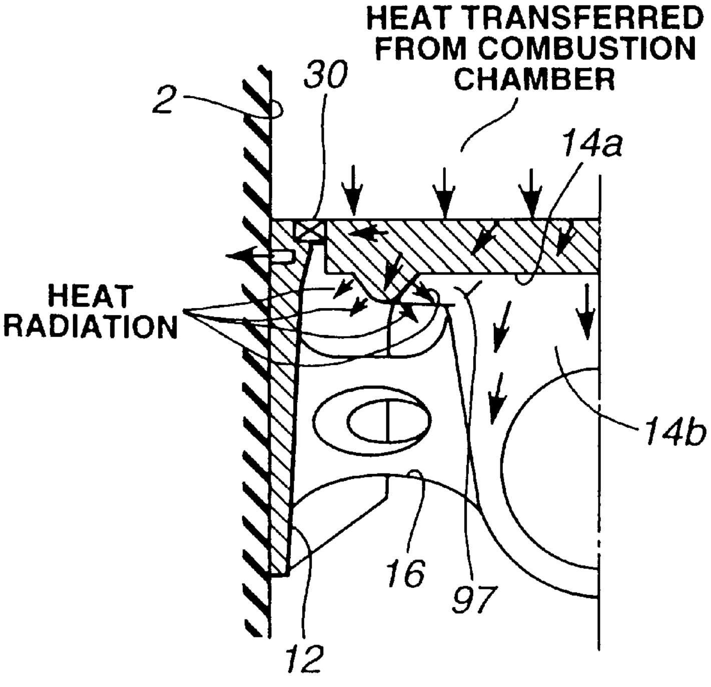
FIG. 29 is a cross section showing the flow of heat transferred from the combustion chamber to the ribbed piston of the fifteenth embodiment.

Referring now to FIGS. 27A and 27B, there is shown the piston of the fifteenth embodiment having the same thermal-expansion absorption ring 30 as discussed above and two pin-boss-to-pin-boss ribs 97. As seen clearly in FIG. 27B, each of the ribs (97, 97) extends from one of the pin boss portions (14*b*, 14*b*) to the other. The ribs (97, 97) are used or formed on the underside of the crown portion 14*a* to form cooling fins to transfer some of the piston heat to the lubricating oil and also used to maintain a desired mechanical strength while decreasing material to lighten the piston. The rib 97, having a substantially L-shape, is integrally formed on the underside of the piston crown portion 14*a* and expanded radially outwards as viewed from the bottom of the piston. The vertex of the substantially L-shaped rib 97 is formed close to a thrust face of the upper skirt portion 12*a*, while both ends of the substantially L-shaped rib 97 are connected to the respective root sections of the pin boss portions (14*b*, 14*b*). The variations of the shape and dimensions of the ribs can be easily made by way of casting. As shown in FIG. 28, the addition of the ribs (97, 97) on the underside of the piston crown portion is advantageous to enhancement of the rigidity of deflection of the perimeter of the crown portion 14*a*, and whereby the downward displacement δ of the perimeter of the piston crown can be reduced. As shown in FIG. 29, the ribs (97, 97) serve as cooling fins. That is, the addition of the ribs increases a heat-radiation surface area of the piston-crown underside exposed to lubricating oil (engine oil), and whereby heat flux toward the pin boss portions (14*b*, 14*b*) can be efficiently reduced. This insures adequate freedom for movement between the piston and pin.

Figure 30A:
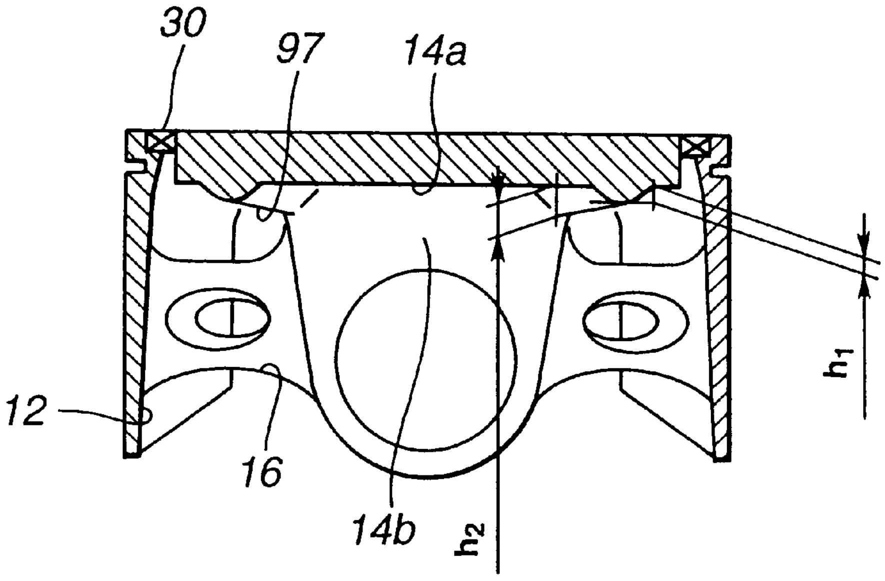
FIGS. 30A and 30B respectively show the cross section in the thrust direction and the bottom view of a sixteenth embodiment of the piston structure.
Figure 30B:
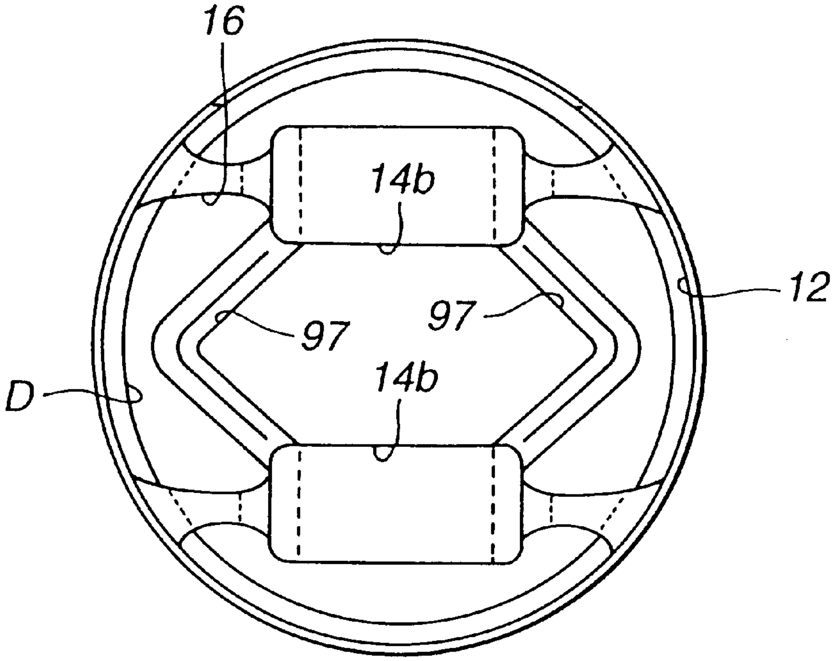

Referring now to FIGS. 30A and 30B, there is shown the piston of the sixteenth embodiment having the same thermal-expansion absorption ring 30 as discussed above and two pin-boss-to-pin-boss ribs (97, 97). As seen in FIGS. 30A and 30B, the ribs of the sixteenth embodiment are slightly different from those of the fifteenth embodiment (FIGS. 27A and 27B), in that the height hi (measured in the axial direction) of the vertex of the rib 97 close to the thrust face of the upper skirt portion 12*a* is lower than the height h2 (measured in the axial direction) of the rib 97 at each of the root sections of the pin boss portions (14*b*, 14*b*). The ribbed piston structure of the sixteenth embodiment (FIGS. 30A and 30B) is superior to that of the fifteenth embodiment (FIGS. 27A and 27B), in more greatly decreasing material to lighten the piston, while maintaining a desired rigidity of deflection of the piston crown portion.

Figure 31A:
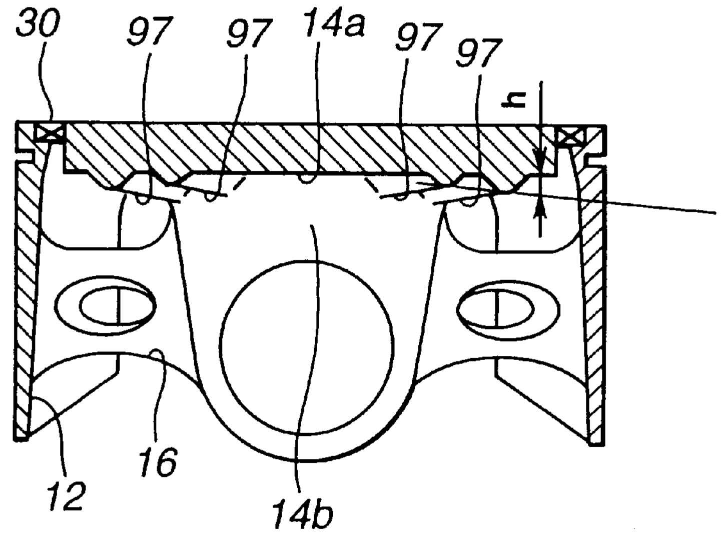
FIGS. 31A and 31B respectively show the cross section in the thrust direction and the bottom view of a seventeenth embodiment of the piston structure.
Figure 31B:
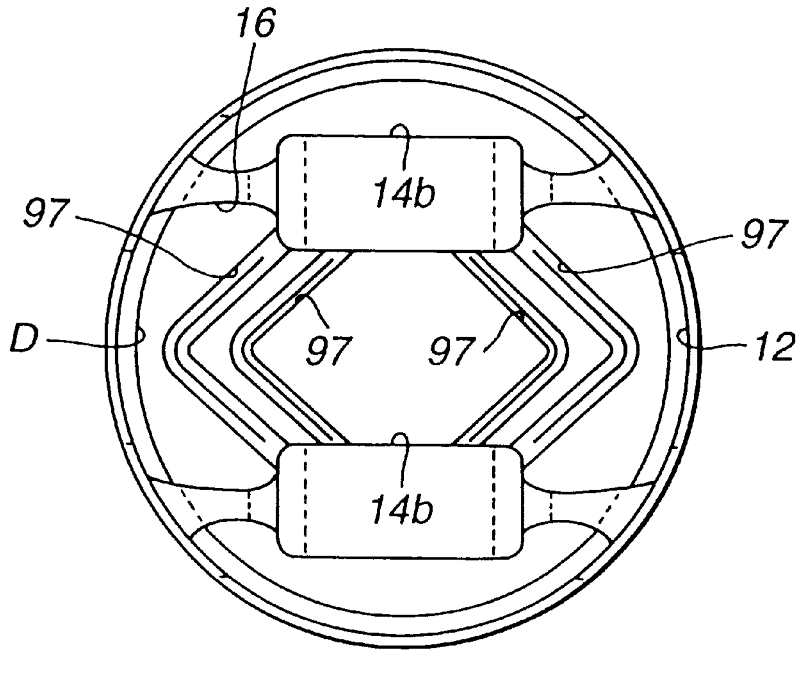

Referring now to FIGS. 31A and 31B, there is shown the piston of the seventeenth embodiment having the same thermal-expansion absorption ring 30 as discussed above and four pin-boss-to-pin-boss ribs (97, 97, 97, 97). As seen in FIGS. 31A and 31B, the ribs of the seventeenth embodiment are slightly different from those of the sixteenth embodiment (FIGS. 30A and 30B), in that the number of ribs is further increased, that is, two inner L-shaped ribs (97, 97) are provided on the underside of the crown portion 14*a* in addition to the two outer L-shaped ribs each having the same shape and dimensions as the rib 97 shown in FIGS. 30A and 30B. As best seen in FIG. 31A, in the rib structure of the seventeenth embodiment, preferably, the height h (measured in cross section cut in the same thrust direction) of the inside rib of two adjacent ribs may be dimensioned to be lower than that of the outside rib. The rigidity of deflection of the perimeter of the crown portion 14*a* can be highly enhanced by the use of a large number of ribs. In addition, the use of a number of cooling fins (the ribs) enhances cooling efficiency, thus more effectively reducing heat flux toward the pin boss portions (14*b*, 14*b*).

Figure 32A:
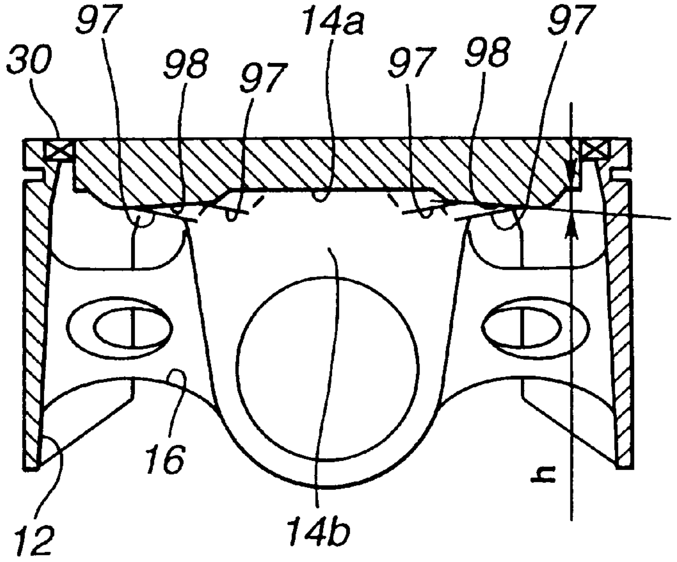
FIGS. 32A and 32B respectively show the cross section in the thrust direction and the bottom view of an eighteenth embodiment of the piston structure.
Figure 32B:
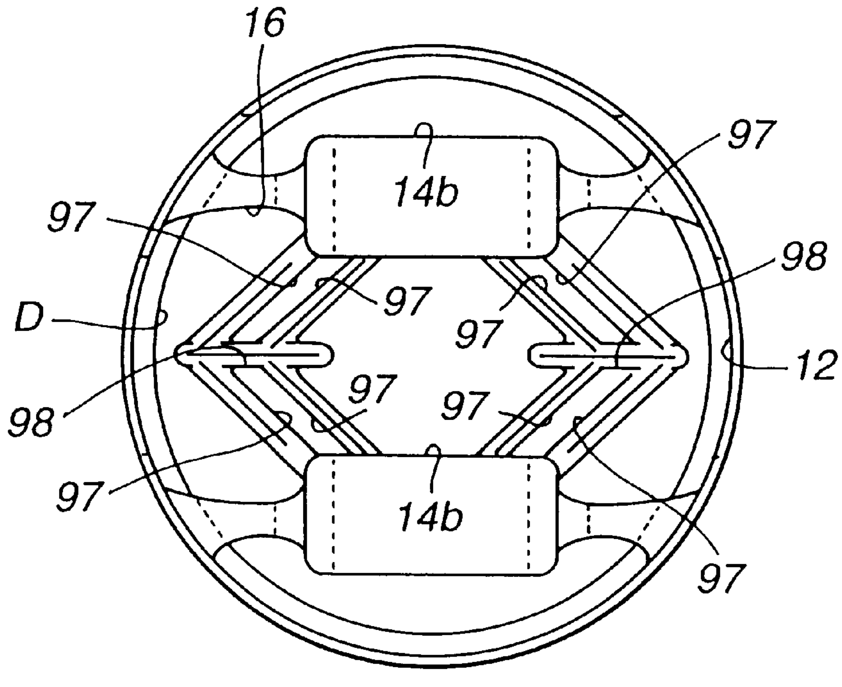

Referring now to FIGS. 32A and 32B, there is shown the piston of the eighteenth embodiment having the same thermal-expansion absorption ring 30 as discussed above and a modified rib structure of the seventeenth embodiment. In the rib structure of the eighteenth embodiment, an intermediate rib 98 is also provided between the two adjacent, substantially L-shaped ribs (97, 97) in such a manner as to interconnect the vertex of the outside rib 97 and the vertex of the inside rib 97. The intermediate rib 98 extends from the vertex of the outside rib 97 across the vertex of the inside rib 97 towards the center of the piston, so that the height h of the intermediate rib 98 decreases gradually towards the center of the piston. The rigidity of deflection of the perimeter of the crown portion 14*a* can be more highly enhanced by the addition of the intermediate ribs (98, 98). The addition of the intermediate ribs (98, 98) increases the heat-radiation surface area, thus more effectively reducing heat flux toward the pin boss portions (14*b*, 14*b*).

Figure 33A:
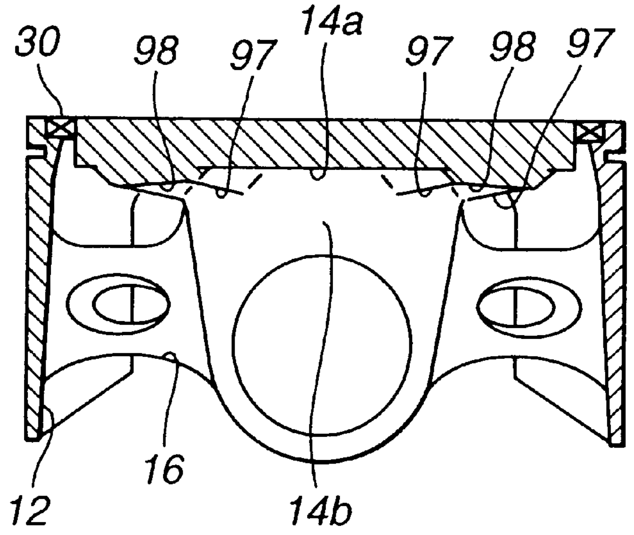
FIGS. 33A and 33B respectively show the cross section in the thrust direction and the bottom view of a nineteenth embodiment of the piston structure.
Figure 33B:
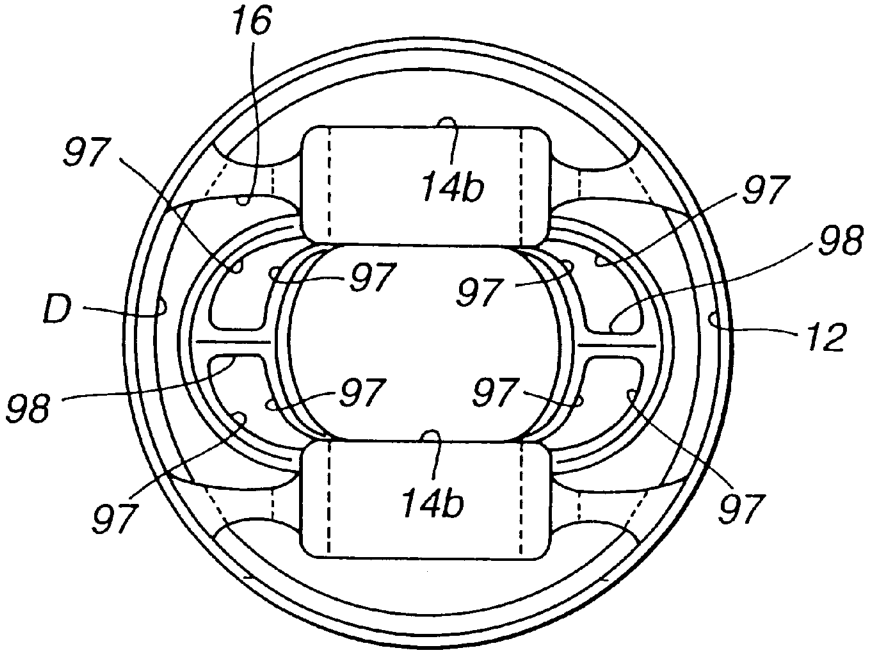

Referring now to FIGS. 33A and 33B, there is shown the piston of the nineteenth embodiment having the same thermal-expansion absorption ring 30 as discussed above and a modified rib structure of the eighteenth embodiment. The rib structure of the nineteenth embodiment is somewhat different from that of the eighteenth embodiment, in that the substantially L-shaped pin-boss-to-pin-boss rib 97 is merely replaced with an circular-arc shaped or arcuate pin-boss-to-pin-boss rib 97. Thus, the ribbed piston of the nineteenth embodiment is able to provide the same effects (enhanced rigidity and superior cooling effect) as the eighteenth embodiment.

The entire contents of Japanese Patent Application Nos. P10-110018 (filed Apr. 21, 1998) and P10-252437 (filed Sep. 7, 1998) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A piston of an internal combustion engine comprising:

a skirt portion adapted to be in sliding-contact with a cylinder wall;

an inner crown-plus-boss portion having a crown portion and piston-pin boss portions;

a stay portion interconnecting said skirt portion and said inner crown-plus-boss portion at a lower portion of the piston; and a partition groove that separates said skirt portion and said inner crown-plus-boss portion and which comprises an annular separation slot which extends completely around a circumference of an upper surface of an upper portion of the piston.

2. The piston as claimed in claim 1, wherein said skirt portion (12) has an upper skirt portion (12*a*) located in the upper portion (20) of the piston and annularly formed all around the circumference of the upper portion (20) of the piston, and a lower skirt portion (12*b*) located in the lower portion (22) of the piston and partly cut away under the piston-pin boss portions (12*b*, 12*b*) in a piston-pin direction.

3. The piston as claimed in claim 1, wherein an outer peripheral wall surface of said skirt portion is formed on a substantially same circumference of a circle throughout an entire axial length of said skirt portion.

4. The piston as claimed in claim 1, which further comprises a single ring groove (24) formed in an outer peripheral wall surface of an upper skirt portion (12*a*) located in the upper portion (20) of the piston, and a piston ring (23) fitted to the single ring groove.

5. The piston as claimed in claim 1, which further comprises a thermal-deflection absorption ring (30) fitted into said partition groove (D) and deformable in a radial direction of the piston for absorbing variations of a radial width of said partition groove.

6. The piston as claimed in claim 5, wherein said thermal-deflection absorption ring has a corrugated wall portion (36) deflectable in the radial direction of the piston.

7. The piston as claimed in claim 5, wherein said thermal-deflection absorption ring has a top wall portion (48; 62) being in sliding-contact with a top face of the I piston, so that the top wall portion is slidable in the radial direction of the piston in presence of the variations of the radial width of said partition groove.

8. The piston as claimed in claim 5, wherein said thermal-deflection absorption ring has a side wall portion (42, 44; 52, 54) facing one of an inner peripheral wall surface of said skirt portion (12) and a cylindrical side wall surface of the crown portion (14*a*) of said inner crown-plus-boss portion (14) and inclined in the radial direction so that one end of the side wall portion of said thermal-deflection absorption ring is in contact with said one of the inner peripheral wall surface of said skirt portion (12) and the cylindrical side wall surface of the crown portion (14*a*), and which further comprises a thermal-deflection absorption clearance (50, 50; 58, 58) defined between another end of the side wall portion of said thermal-deflection absorption ring and said one of the inner peripheral wall surface of said skirt portion (12) and the cylindrical side wall surface of the crown portion (14*a*) for absorbing the variations of the radial width of said partition groove.

9. The piston as claimed in claim 5, wherein said thermal-deflection absorption ring has a curved surface portion (68) having a substantially circular-arc shape in cross section and being curved inwards in the radial direction of the piston so that one end of the curved surface portion of said thermal-deflection absorption ring is in sliding-contact with one of an inner peripheral wall surface of said skirt portion (12) and a cylindrical side wall surface of the crown portion (14*a*) of said inner crown-plus-boss portion (14), and which further comprises a thermal-deflection absorption clearance (72) defined between another end of the curved surface portion of said thermal-deflection absorption ring and said one of the inner peripheral wall surface of said skirt portion (12) and the cylindrical side wall surface of the crown portion (14*a*) for absorbing the variations of the radial width of said partition groove.

10. The piston as claimed in claim 5, which further comprises a projected edged portion (60) formed on at least one of an upper inside edged portion of said skirt portion (12) and an upper outside edged portion of the crown portion (14*a*) and radially projecting towards said partition groove (D), for preventing falling of said thermal-deflection absorption ring.

11. The piston as claimed in claim 5, which further comprises a radially-protruding portion (64, 64; 74) formed in said thermal-deflection absorption ring, and a recessed portion (66, 66; 76) formed on at least one of an inner peripheral wall surface of said skirt portion (12) and a cylindrical side wall surface of the crown portion (14*a*) of said inner crown-plus-boss portion (14), so that the radially-protruding portion (64, 64; 74) is fitted into the recessed portion (66, 66; 76).

12. The piston as claimed in claim 5, wherein said thermal-deflection absorption ring has an oil passage (80) extending in a circumferential direction of the piston, and an oil hole (78) communicating the oil passage (80) for introducing lubricating oil into the oil passage (80) or exhausting the lubricating oil from the oil passage (80).

13. The piston as claimed in claim 12, wherein said thermal-deflection absorption ring has a pair of side wall portions (42, 44) respectively being in contact with an inner peripheral wall surface of said skirt portion (12) and a cylindrical side wall surface of the crown portion (14*a*) of said inner crown-plus-boss portion (14), and at least one of the pair of side wall portions (42, 44) has an auxiliary oil hole (82; 88; 96) communicating the oil passage (80).

14. The piston as claimed in claim 13, which further comprises an oil receiving portion (84; 92) formed in at least one of the inner peripheral wall surface of said skirt portion (12) and the cylindrical side wall surface of the crown portion (14*a*) to oppose the auxiliary oil hole (82; 88; 96).

15. The piston as claimed in claim 12, wherein said thermal-deflection absorption ring has a pair of side wall portions (42, 44) respectively being in contact with an inner peripheral wall surface of said skirt portion (12) and a cylindrical side wall surface of the crown portion (14*a*) of said inner crown-plus-boss portion (14), and at least one of the pair of side wall portions (42, 44) has a hole-flanged portion (86; 90) formed with an auxiliaryoil hole (82; 88) communicating the oil passage (80), and which further comprises an oil receiving portion (84; 92) formed in at least one of the inner peripheral wall surface of said skirt portion (12) and the cylindrical side wall surface of the crown portion (14*a*) to oppose the auxiliary oil hole (82; 88), and the hole-flanged portion is fitted into the oil receiving portion.

16. The piston as claimed in claim 12, wherein said thermal-deflection absorption ring has a pair of side wall portions (42, 44) respectively being in contact with an inner peripheral wall surface of said skirt portion (12) and a cylindrical side wall surface of the crown portion (14*a*) of said inner crown-plus-boss portion (14), and at least one of the pair of side wall portions (42, 44) has a plurality of slotted portions (94) each having an auxiliary oil hole (96) communicating the oil passage (80) and a pair of radially-inwardly protruding upper and lower flanges (94*a*, 94*b*), and which further comprises an oil receiving portion (84) formed in at least one of the inner peripheral wall surface of said skirt portion (12) and the cylindrical side wall surface of the crown portion (14*a*) to oppose the auxiliary oil hole (96), and the plurality of slotted portions (94) are fitted into the oil receiving portion (84).

17. The piston as claimed in claim 1, wherein said inner crown-plus-boss portion (14) has a rib (97) integrally formed on an underside of the crown portion (14*a*) and expanded radially outwards so that a vertex of the rib is formed close to either thrust side of a major thrust face and a minor thrust face of said skirt portion (12) while both ends of the rib are connected to respective root sections of the piston-pin boss portions (14*b*, 14*b*).

18. The piston as claimed in claim 17, wherein the rib (97) is dimensioned so that a height (h1) of the vertex of the rib close to the thrust side of side skirt portion (12) is lower than a height (h2) of the rib at each of the root sections of the piston-pin boss portions (14*b*, 14*b*).

19. The piston as claimed in claim 1, wherein said inner crown-plus-boss portion (14) has a plurality of ribs (97) integrally formed on an underside of the crown portion (14*a*) and expanded radially outwards so that a vertex of each of the ribs is formed close to either thrust side of a major thrust face and a minor thrust face of said skirt portion (12) while both ends of each of the ribs are connected to respective root sections of the piston-pin boss portions (14*b*, 14*b*), and wherein each of the ribs (97) is dimensioned so that a height (h1) of the vertex of each of the ribs close to the thrust side of said skirt portion (12) is lower than a height (h2) of each of the ribs at each of the root sections of the piston-pin boss portions (14*b*, 14*b*).

20. The piston as claimed in claim 19, wherein a height (h) of an inside rib of two adjacent ribs, measured in a same thrust direction, is lower than a height of an outside rib of the two adjacent ribs.

21. The piston as claimed in claim 19, wherein said inner crown-plus-boss portion (14) has an intermediate rib (98) integrally formed on the underside of the crown portion (14*a*) so that the intermediate rib (98) interconnects vertexes of the two adjacent ribs, and wherein the intermediate rib (98) is dimensioned so that a height (h) of the intermediate rib decreases gradually towards a center of the piston.

22. The piston as claimed in claim 5, wherein said thermal-deflection absorption ring defines at least one annular hollow space within said partition groove.

23. The piston as claimed in claim 5, wherein said thermal-deflection absorption ring has an indent portion which defines at least one annular space within said partition groove.

24. A piston of an internal combustion engine comprising:

a skirt portion having an upper annular end;

an inner crown-plus-boss portion having a crown portion and piston-pin boss portions, the crown portion having a peripheral edge portion located in a contact-free relationship inboard of and juxtaposedly spaced from the upper annular end of the skirt portion, to define an annular void via which free fluid communication between a space above the crown portion and a space below the piston-pin boss portion, is permitted, said annular void extending completely and continuously about the periphery of the crown portion to completely separate the crown and boss portion from the skirt portion; and a resilient ring member disposed in the annular void so as to interconnect the upper annular end of the skirt portion and the peripheral edge portion of the crown portion in a manner which closes the annular void and prevents the free fluid communication therethrough.

25. The piston as claimed in claim 24, further comprising a stay portion interconnecting said skirt portion and said inner crown-plus-boss portion at a lower portion of the piston and at a level which is separate and spaced from the connection provided by the ring member.

26. A piston of an internal combustion engine comprising:

a skirt portion having an upper annular end;

an inner crown-plus-boss portion having a crown portion an piston-pin boss portions, the crown portion having a peripheral edge portion located in a contact-free relationship inboard of and juxtaposedly spaced from the upper annular end of the skirt portion, to define an annular void via which free fluid communication between a space above the crown portion and a space below the piston-pin boss portion, is permitted;

a ring member disposed in the annular void so as to interconnect the upper annular end of the skirt portion and the peripheral edge portion of the crown portion in a manner which closes the annular void and prevents the free fluid communication therethrough; and wherein said ring member has at least one wall member which flexes and absorbs thermally induced radial expansion of the crown portion toward the upper annular end of the skirt portion.

27. The piston as claimed in claim 24, wherein said ring member defines at least one annular, hollow space within the annular void into which oil can be introduced from the space below the piston-pin boss portion.

28. A piston of an internal combustion engine comprising:

a skirt portion having an upper annular end;

an inner crown-plus-boss portion having a crown portion and piston-pin boss portions, the crown portion having a peripheral edge portion located in a contact-free relationship inboard of and juxtaposedly spaced from the upper annular end of the skirt portion, to define an annular void via which free fluid communication between a space above the crown portion and a space below the piston-pin boss portion, is permitted; and thermal-expansion absorption ring means disposed in the annular void for interconnecting the upper annular end of the skirt portion and the peripheral edge portion of the crown portion in a manner which closes the annular void, prevents the free fluid communication therethrough, and resiliently absorbs thermal expansion of said inner crown-plus-boss portion toward the upper annular end of said skirt portion.

* * * * *